(12) United States Patent
Hong et al.

(10) Patent No.: US 9,244,301 B2
(45) Date of Patent: Jan. 26, 2016

(54) DISPLAY DEVICE AND MANUFACTURING METHOD THEREOF

(71) Applicant: Samsung Display Co., Ltd., Yongin, Gyeonggi-Do (KR)

(72) Inventors: Seok-Joon Hong, Seongnam-si (KR); Kyung Tae Chae, Hwaseong-si (KR); Yong Seok Kim, Seoul (KR)

(73) Assignee: SAMSUNG DISPLAY CO., LTD. (KR)

( * ) Notice: Subject to any disclaimer, the term of this patent is extended or adjusted under 35 U.S.C. 154(b) by 146 days.

(21) Appl. No.: 13/940,511

(22) Filed: Jul. 12, 2013

(65) Prior Publication Data
US 2014/0253836 A1    Sep. 11, 2014

(30) Foreign Application Priority Data
Mar. 8, 2013 (KR) .................... 10-2013-0025140

(51) Int. Cl.
  *G02F 1/1337* (2006.01)
  *G02F 1/1333* (2006.01)
  *G02F 1/1343* (2006.01)

(52) U.S. Cl.
  CPC .... *G02F 1/133377* (2013.01); *G02F 1/133707* (2013.01); *G02F 1/134363* (2013.01); *G02F 2001/134318* (2013.01)

(58) Field of Classification Search
  CPC ................................................... G02F 1/1333
  USPC ............................................ 348/138; 438/30
  See application file for complete search history.

(56) References Cited

U.S. PATENT DOCUMENTS

| | | | | |
|---|---|---|---|---|
| 5,978,062 A * | 11/1999 | Liang et al. | ................... | 349/155 |
| 6,141,072 A * | 10/2000 | Drabik et al. | ................. | 349/122 |
| 6,779,247 B1 * | 8/2004 | Murari et al. | ............. | 29/603.01 |
| 7,961,273 B2 * | 6/2011 | Moriya et al. | .................. | 349/75 |
| 8,169,569 B2 | 5/2012 | Kang et al. | | |
| 2005/0088261 A1 * | 4/2005 | Liu et al. | ....................... | 333/262 |
| 2007/0153180 A1 * | 7/2007 | Lim et al. | ..................... | 349/122 |
| 2010/0051951 A1 | 3/2010 | Lee et al. | | |
| 2010/0149464 A1 | 6/2010 | Han et al. | | |
| 2010/0165044 A1 * | 7/2010 | Park et al. | ...................... | 347/40 |
| 2010/0239977 A1 * | 9/2010 | Banba | ....................... | 430/270.1 |
| 2011/0156995 A1 * | 6/2011 | Choi et al. | ....................... | 345/92 |
| 2012/0062448 A1 * | 3/2012 | Kim et al. | ......... | G02F 1/133377 345/55 |

(Continued)

FOREIGN PATENT DOCUMENTS

JP        2010-055065 A     3/2010
KR   1020070060243 A    12/2005

(Continued)

*Primary Examiner* — Sang V Nguyen
(74) *Attorney, Agent, or Firm* — Cantor Colburn LLP

(57) ABSTRACT

A display device includes a substrate, a thin film transistor disposed on the substrate, a pixel electrode connected to the thin film transistor, a common electrode disposed on the pixel electrode and spaced apart from the pixel electrode, where a microcavity is defined between the pixel electrode and the common electrode, and a common electrode cutout is defined in the common electrode; a roof layer disposed on the common electrode, a liquid crystal injection hole formed through the common electrode and the roof layer, where the liquid crystal injection hole exposes a portion of the microcavity, a liquid crystal layer disposed in the microcavity, and an encapsulation layer disposed on the roof layer, where the encapsulation layer covers the liquid crystal injection hole and seals the microcavity.

17 Claims, 30 Drawing Sheets

(56) References Cited

U.S. PATENT DOCUMENTS

| | | | |
|---|---|---|---|
| 2012/0086895 A1* | 4/2012 | Lee et al. | 349/106 |
| 2012/0099055 A1* | 4/2012 | Kim et al. | 349/106 |
| 2012/0154727 A1* | 6/2012 | Chang et al. | G02F 1/133707 349/129 |
| 2012/0229724 A1* | 9/2012 | Miyairi et al. | 349/43 |
| 2012/0281172 A1* | 11/2012 | Park et al. | G02F 1/133707 349/123 |
| 2013/0161604 A1* | 6/2013 | Huang et al. | 257/43 |
| 2013/0250220 A1* | 9/2013 | Kim et al. | 349/123 |
| 2013/0308071 A1* | 11/2013 | Kim et al. | 349/43 |
| 2013/0321734 A1* | 12/2013 | Won et al. | 349/43 |
| 2013/0335664 A1* | 12/2013 | Shim et al. | 349/43 |
| 2014/0055726 A1 | 2/2014 | Cho et al. | |

FOREIGN PATENT DOCUMENTS

| | | |
|---|---|---|
| KR | 1020130134153 A | 12/2013 |
| KR | 1020140025081 A | 3/2014 |
| KR | 1020140048731 A | 4/2014 |

\* cited by examiner

DISPLAY DEVICE AND MANUFACTURING METHOD THEREOF

This application claims priority to Korean Patent Application No. 10-2013-0025140 filed on Mar. 8, 2013, and all the benefits accruing therefrom under 35 U.S.C. §119, the content of which in its entirety is herein incorporated by reference.

BACKGROUND (a) Field

Exemplary embodiments of the invention relate to a display device and a manufacturing method of the display device, and more particularly, to a display device in which cutouts are provided on a common electrode of the display device using one substrate, and a manufacturing method of the display device.

(b) Description of the Related Art

A liquid crystal display, which is one of the most widely used types of flat panel display, typically includes two display panels with field generating electrodes such as a pixel electrode, a common electrode and the like, and a liquid crystal layer interposed therebetween. In the liquid crystal display, an electric field is generated in the liquid crystal layer by applying a voltage to the field generating electrodes to determine alignment of liquid crystal molecules of the liquid crystal layer through the generated electric field and control polarization of incident light, thereby displaying images.

The two display panels of the liquid crystal display may include a thin film transistor array panel and an opposing display panel. In the thin film transistor array panel, a gate line for transferring a gate signal and a data line for transferring a data signal are provided crossing each other, and a thin film transistor connected to the gate line and the data line, a pixel electrode connected with the thin film transistor, and the like may be disposed thereon. In such a liquid crystal display, a light blocking member, a color filter, a common electrode and the like, may be disposed on the opposing display panel, or on the thin film transistor array panel.

In a conventional liquid crystal display, two substrates are generally used, and respective constituent elements are provided on the two substrates.

SUMMARY

Exemplary embodiments of the invention relate to a display device including a single substrate, thereby having reduced weight and thickness, and a manufacturing method of the display device with reduced cost and processing time by manufacturing the display device using a single substrate.

Exemplary embodiments of the invention relate to a display device and a manufacturing method of the display device in which cutouts are formed on a common electrode thereof using a single substrate.

An exemplary embodiment of a display device includes: a substrate; a thin film transistor disposed on the substrate; a pixel electrode connected to the thin film transistor; a common electrode disposed on the pixel electrode and spaced apart from the pixel electrode, where a microcavity is defined between the pixel electrode and the common electrode, and a common electrode cutout is defined in the common electrode; a roof layer disposed on the common electrode; a liquid crystal injection hole formed through the common electrode and the roof layer, where the liquid crystal injection hole exposes a portion of the microcavity; a liquid crystal layer disposed in the microcavity; and an encapsulation layer disposed on the roof layer, where the encapsulation layer covers the liquid crystal injection hole and seals the microcavity.

In an exemplary embodiment, the common electrode cutout may have a cross shape.

In an exemplary embodiment, a pixel electrode cutout may be defined in the pixel electrode, where the pixel electrode cutout is adjacent to at least a portion of an edge of the pixel electrode and extends along the edge of the pixel electrode.

In an exemplary embodiment, an end of the common electrode cutout may protrude over the edge of the pixel electrode, when viewed from a top view.

In an exemplary embodiment, the display device may further include a first alignment layer disposed on the pixel electrode; and a second alignment layer disposed below the common electrode, in which at least one of the first alignment layer and the second alignment layer may be photo-aligned layer including a photopolymerizable material.

In an exemplary embodiment, the liquid crystal layer may include liquid crystal molecules, and the liquid crystal molecules may be aligned substantially vertically with respect to the surface of the substrate when an electric field is not generated in the liquid crystal layer.

In an exemplary embodiment, the liquid crystal molecules may be aligned in a pretilt direction which is substantially parallel to a direction toward a central portion of the common electrode cutout of the common electrode from a point where the edge of the pixel electrode meets.

In an exemplary embodiment, the pixel electrode may be divided into a plurality of subregions by the edge of the pixel electrode and the common electrode cutout of the common electrode, and the liquid crystal molecules of the liquid crystal layer may be aligned in different pretilt directions in each subregion.

In an exemplary embodiment, the display device may further include a gate line disposed on the substrate, and a data line disposed on the substrate crossing the gate line, in which a plurality of pixel areas may be defined on the substrate, the pixel areas may include a first subpixel area and a second subpixel area which are spaced apart from each other with the gate line therebetween, the pixel electrode may include a first subpixel electrode disposed in the first subpixel area and a second subpixel electrode disposed in the second subpixel area, and the common electrode and the roof layer may cover a side of the microcavity at an edge of the pixel area.

In an exemplary embodiment, the side of the microcavity at the edge of the pixel area covered by the common electrode and the roof layer may be substantially parallel to the data line, and the liquid crystal injection hole may be formed between the first subpixel area and the second subpixel area.

Another exemplary embodiment of a manufacturing method of a display device includes: providing a thin film transistor on a substrate; providing a pixel electrode connected to the thin film transistor on the substrate; providing a sacrificial layer on the pixel electrode; providing a common electrode on the sacrificial layer; providing a common electrode cutout by patterning the common electrode; providing a roof layer on the common electrode; providing a liquid crystal injection hole, which exposes a portion of the sacrificial layer, by patterning the roof layer; providing a microcavity between the pixel electrode and the common electrode by removing the sacrificial layer; providing a liquid crystal layer by injecting a liquid crystal material into the microcavity through the liquid crystal injection hole; and providing an encapsulation layer on the roof layer to seal the microcavity.

In an exemplary embodiment, the manufacturing method of a display device may further include thermal-curing the sacrificial layer, after providing the sacrificial layer.

In an exemplary embodiment, the providing the common electrode cutout by patterning the common electrode may include coating a photosensitive film on the common electrode; providing a photosensitive film pattern by exposing and developing the photosensitive film using a mask; providing a common electrode cutout by etching the common electrode using the photosensitive film pattern; and removing the photosensitive film pattern by exposing and developing substantially an entire surface of the photosensitive film pattern.

In an exemplary embodiment, the sacrificial layer and the photosensitive film may include positive photosensitive materials.

In an exemplary embodiment, the removing the photosensitive film pattern may include developing the photosensitive film pattern using a developer.

In an exemplary embodiment, the developer may include tetramethyl ammonium hydroxide ("TMAH").

In an exemplary embodiment, the removing the sacrificial layer may include using a stripper or an ashing process.

In an exemplary embodiment, the common electrode cutout may have a cross shape, a pixel electrode cutout is defined in the pixel electrode, where the pixel electrode cutout may be adjacent to an edge of the pixel electrode and extend along the edge of the pixel electrode, and an end of the common electrode cutout may protrude over the edge of the pixel electrode, when viewed from a top view.

In an exemplary embodiment, the manufacturing method of a display device may further include providing a first alignment layer on the pixel electrode and providing a second alignment layer below the common electrode by injecting a photopolymerizable material and an alignment material through the liquid crystal injection hole, after the providing the liquid crystal injection hole, and providing pretilt directions on the first alignment layer and the second alignment layer by generating an electric field in the liquid crystal layer and irradiating light, after the providing the liquid crystal layer.

In an exemplary embodiment, a plurality of pixel areas may be defined on the substrate, and the common electrode and the roof layer may cover a side of the microcavity at an edge of the pixel area.

According to exemplary embodiments of the invention, a display device includes a single substrate, thereby having reduced weight and thickness, and a manufacturing method of the display device is performed with reduced cost and processing time by manufacturing the display device using a single substrate.

In such embodiments, damage on a sacrificial layer is effectively prevented by thermally-curing the sacrificial layer and removing a photosensitive film pattern positioned on a common electrode using a developer after exposing the entire surface of the photosensitive film pattern.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
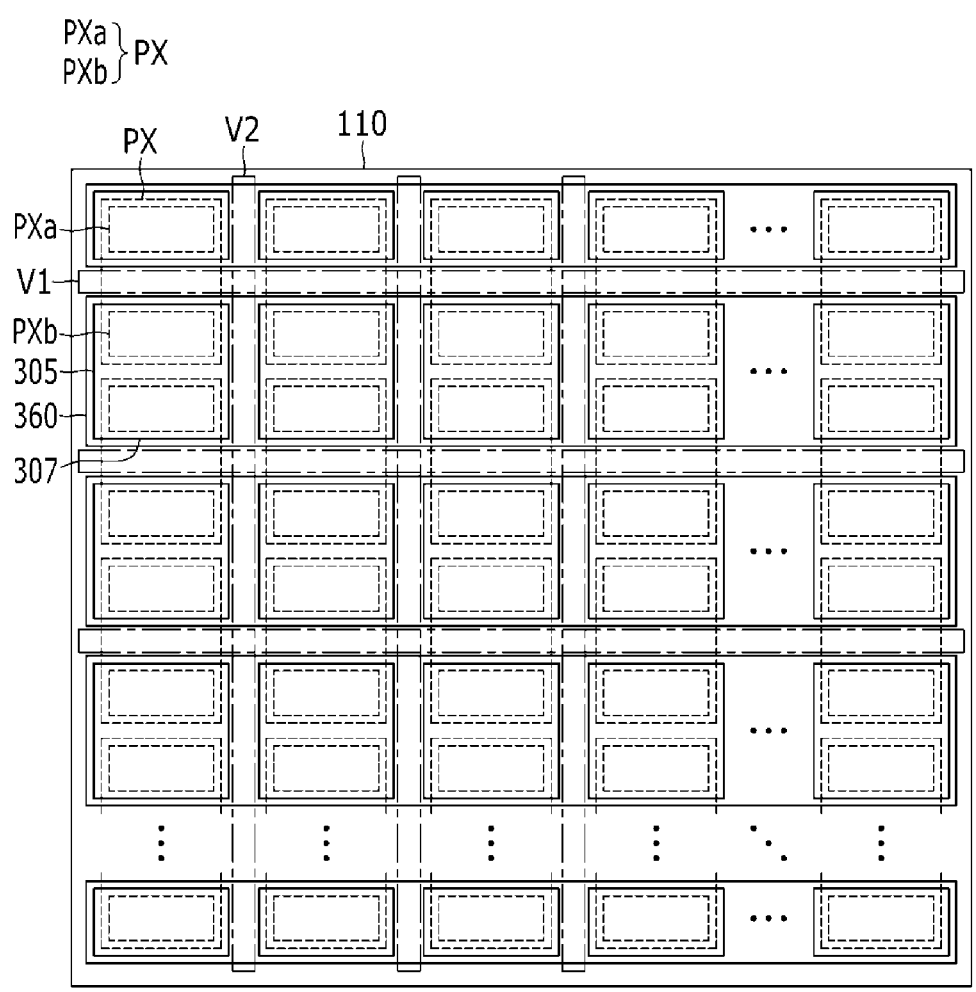
FIG. 1 is a top plan view illustrating an exemplary embodiment of a display device according to the invention.

The invention will be described more fully hereinafter with reference to the accompanying drawings, in which embodiments of the invention are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on," "connected to" or "coupled to" another element or layer, the element or layer can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims set forth herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, embodiments of the invention will be described in further detail with reference to the accompanying drawings.

First, an exemplary embodiment of a display device according to the invention will hereinafter be described with reference to FIG. 1.

FIG. 1 is a top plan view illustrating an exemplary embodiment of a display device according to the invention.

An exemplary embodiment of a display device according to the invention includes a substrate 110 including a material such as glass or plastic, for example.

A plurality of pixel areas PX is defined on the substrate 110. The pixel areas PX are arranged substantially in a matrix form, which includes a plurality of pixel rows and a plurality of pixel columns. Each pixel area PX may include a first subpixel area PXa and a second subpixel area PXb. In an exemplary embodiment, as shown in FIG. 1, the first subpixel area PXa and the second subpixel area PXb may be vertically disposed in each pixel area PX, e.g., arranged in a pixel column direction in each pixel area PX.

A microcavity 305 covered by a roof layer 360 is defined on the substrate 110. The roof layers 360 are connected to each other in a row direction, the roof layer 360 may cover a plurality of microcavities 305 arranged in a pixel row direction.

A first valley V1 is positioned between the first subpixel area PXa and the second subpixel area PXb in the pixel row direction, and a second valley V2 is positioned between the pixel columns.

In an exemplary embodiment, a plurality of roof layers 360 is spaced apart from each other with the first valley V1 therebetween. At least a portion of the microcavity 305 is exposed by the roof layer 360. In one exemplary embodiment, for example, a portion of the roof layer 360 outside at a portion contacting the first valley V1 exposes the microcavity 305. The exposed portion of the microcavity 305 is also referred to as a liquid crystal injection hole 307.

Each roof layer 360 between adjacent second valleys V2 is spaced apart from the substrate 110 and defines the microcavity 305. Each roof layer 360 110 at the second valley V2 is disposed substantially close to the substrate 110 and covers both sides of the microcavity 305.

An exemplary embodiment of the display device according to the invention is as shown in FIG. 1 and as described above, but the invention is not limited thereto, and may be variously modified. In one alternative exemplary embodiment, for example, the arrangement of the pixel area PX, the first valley V1, and the second valley V2 may be changed, and roof layers 360 may be connected to each other at the first valley V1, and a portion of each roof layer 360 may be spaced apart from the substrate 110 at the second valley V2 and thus the adjacent microcavities 305 may be connected to each other.

Next, a pixel of an exemplary embodiment of the display device according to the invention will be described below with reference to FIGS. 2 and 3.

Figure 2:
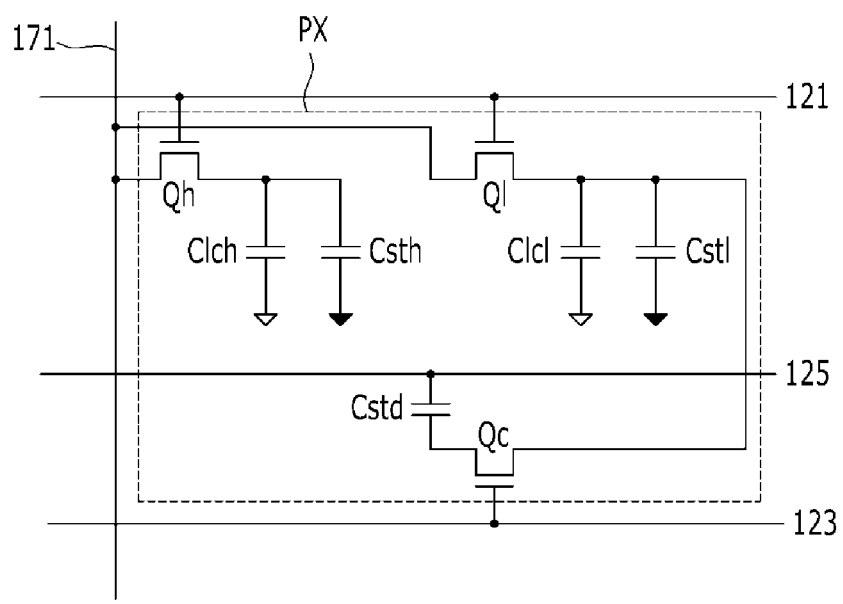
FIG. 2 is an equivalent circuit diagram showing a pixel of an exemplary embodiment of the display device according to the invention.
Figure 3:
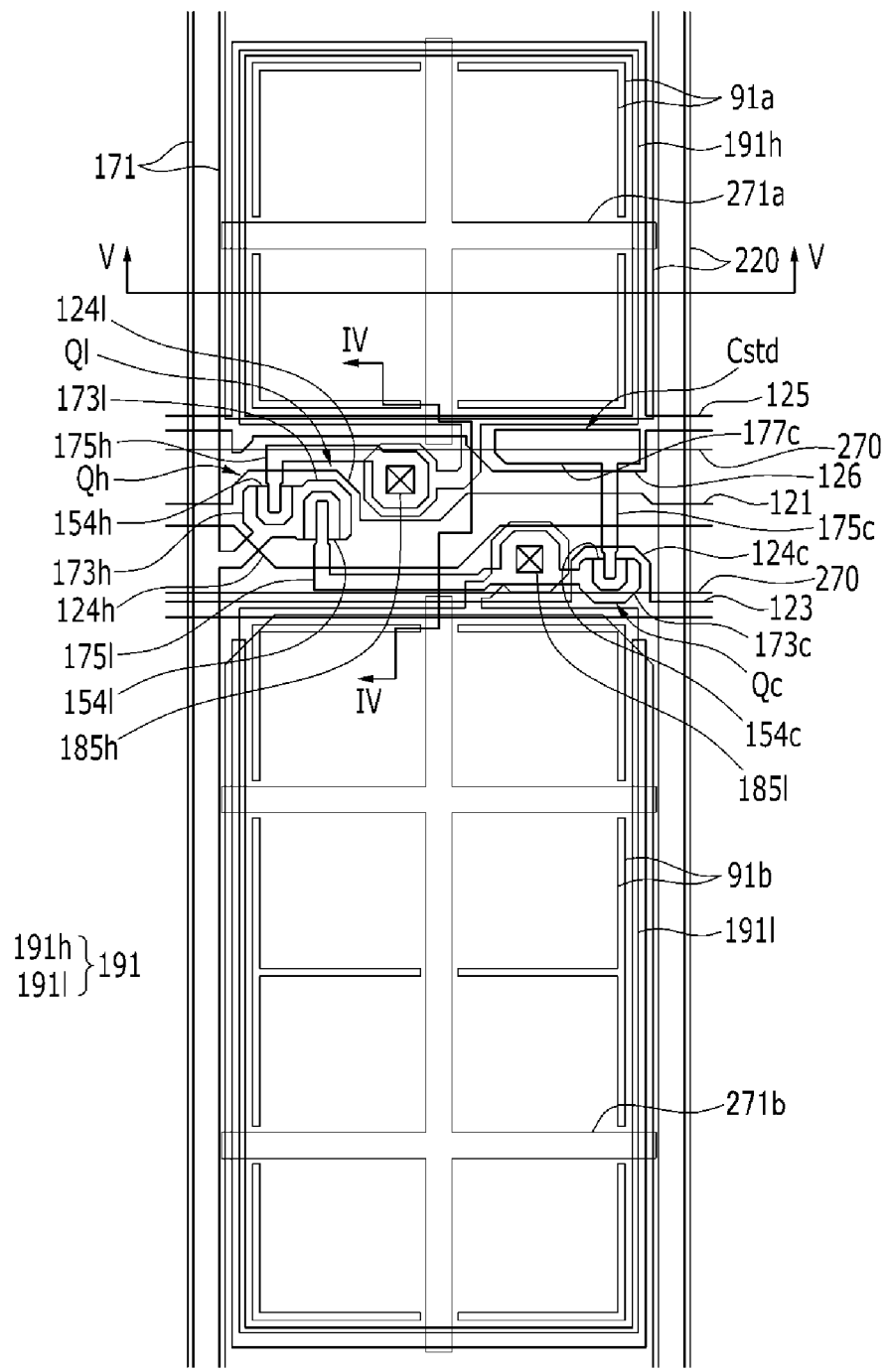
FIG. 3 is a top plan view illustrating a pixel of an exemplary embodiment of the display device according to the invention.

FIG. 2 is an equivalent circuit diagram showing a pixel of an exemplary embodiment of the display device according to the invention, and FIG. 3 is a top plan view of a pixel of an exemplary embodiment of the display device according to the invention.

An exemplary embodiment of the display device according to the invention includes signal lines such as a gate line 121, a storage electrode line 125, a step-down gate line 123 and a data line 171.

In such an embodiment, as shown in FIG. 2, a first switching element Qh, a second switching element Ql, a third switching element Qc, a first liquid crystal capacitor Clch, a second liquid crystal capacitor Clcl, a first storage capacitor Csth, a second storage capacitor Cstl, and a step-down capacitor Cstd are connected to the signal lines. Hereinafter, the first switching element Qh will also be referred to as a first thin film transistor Qh, the second switching element Ql will also be referred to as a second thin film transistor Ql, and the third switching element Qc will also be referred to as a third thin film transistor Qc.

The first and second switching elements Qh and Ql are connected to the gate line 121 and the data line 171, respectively, and the third switching element Qc is connected to the step-down gate line 123.

The first and second switching elements Qh and Ql may be three-terminal elements such as a thin film transistor disposed on the substrate 110. In such an embodiment, each of control terminals of the first and second switching elements Qh and Ql is connected to the gate line 121, each of input terminals of the first and second switching elements Qh and Ql is connected to the data line 171, and output terminals of the first and second switching elements Qh and Ql are connected to the first and second liquid crystal capacitors Clch and Clcl and the first and second storage capacitors Csth and Cstl, respectively.

The third switching element Qc may be a three-terminal element such as a thin film transistor disposed on the substrate 110. In such an embodiment, a control terminal of the third switching element Qc is connected to the step-down gate line 123, an input terminal of the third switching element Qc is connected to the second liquid crystal capacitor Clcl, and an output terminal of the third switching element Qc is connected to the step-down capacitor Cstd.

In an exemplary embodiment, the first and second liquid crystal capacitors Clch and Clcl are formed by overlapping the first and second subpixel electrodes 191h and 191l, which are connected to the first and second switching elements Qh and Q, and the common electrode 270. The first and second subpixel electrodes 191h and 191l are disposed below the microcavity 305, and the common electrode 270 is disposed on the microcavity 305. The first and second storage capacitors Csth and Cstl are formed by overlapping the storage electrode line 125, and the first and second subpixel electrodes 191h and 191l.

The step-down capacitor Cstd is connected to the output terminal of the third switching element Qc and the storage electrode line 125, and the step-down capacitor Cstd is defined by the storage electrode line 125 and the output terminal of the third switching element Qc which overlaps each other with an insulator therebetween.

Then, an exemplary embodiment of a driving method of the display device illustrated in FIGS. 2 and 3 will be described.

When a gate-on signal is applied to the gate line 121, the first switching element Qh and the second switching element Ql, which are connected to the gate line 121, are turned on. When the first switching element Qh and the second switching element Ql are turned on, the data voltage applied to the data line 171 is applied to the first subpixel electrode 191h and the second subpixel electrode 191l through the turned-on first switching element Qh and second switching element Ql. In an exemplary embodiment, magnitudes of the data voltages applied to the first subpixel electrode 191h and the second subpixel electrode 191l are substantially the same as each other. In such an embodiment, the voltages charged in the first and second liquid crystal capacitors Clch and Clcl are also substantially the same as each other.

Thereafter, when a gate-off signal is applied to the gate line 121 and the gate-on signal is applied to the step-down gate line 123, the first switching element Qh and the second switching element Ql are turned off and the third switching element Qc is turned on. Then, charges move to the step-down capacitor Cstd from the second subpixel electrode 191l through the third switching element Qc. Then, the charged voltage of the second liquid crystal capacitor Clcl is decreased, and the step-down capacitor Cstd is charged. In such an embodiment, the charged voltage of the second liquid crystal capacitor Clcl is decreased by capacitance of the step-down capacitor Cstd such that the charged voltage of the second liquid crystal capacitor Clcl is lower than the charged voltage of the first liquid crystal capacitor Clch.

In an exemplary embodiment, the charged voltages of the two liquid crystal capacitors Clch and Clcl represent different gamma curves from each other, and a gamma curve of a pixel voltage becomes a curve acquired by combining the different gamma curves. A combined gamma curve at the front may be set to coincide with a predetermined reference gamma curve at the front, which is most appropriately determined, and a combined gamma curve at the side may be set to be substantially closest to the reference gamma curve at the front. In such an embodiment, side visibility is substantially improved by converting image data.

Next, an exemplary embodiment of the display device according to the invention will be described in greater detail with reference to FIGS. 3 to 5.

Figure 4:
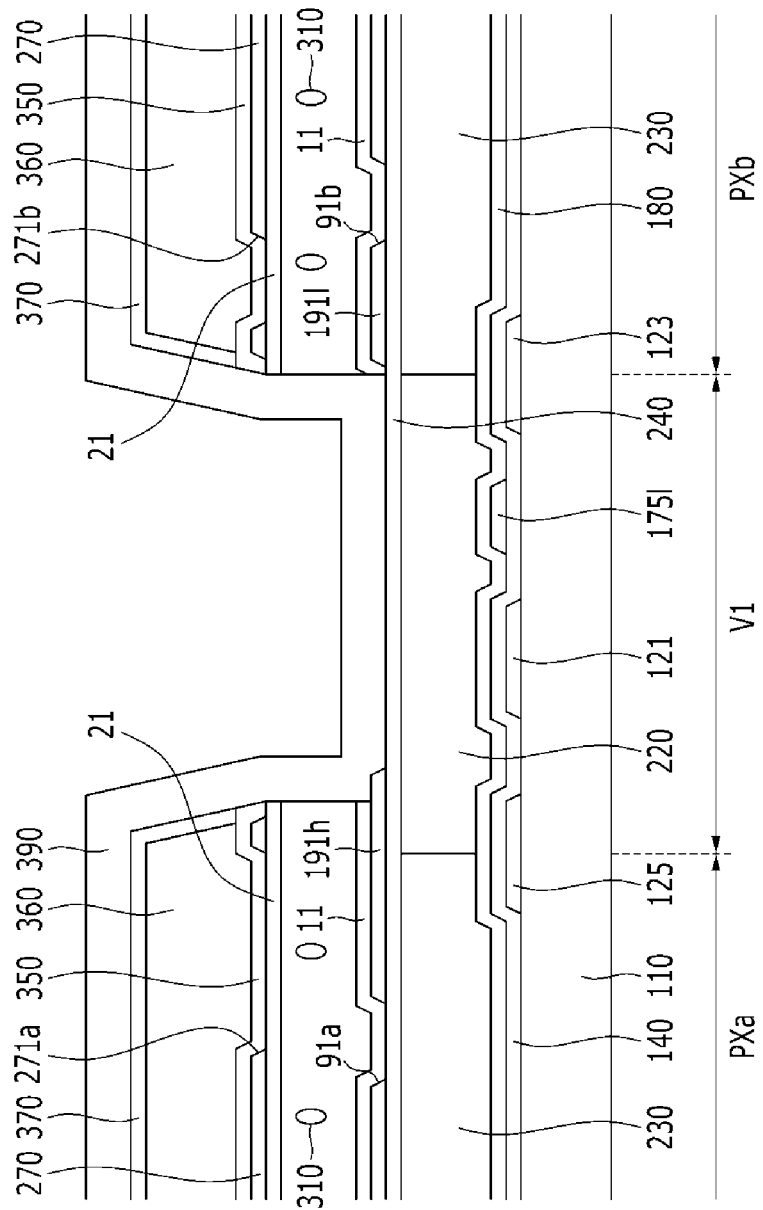
FIG. 4 is a cross-sectional view taken along line IV-IV of the display device of FIG. 3.
Figure 5:
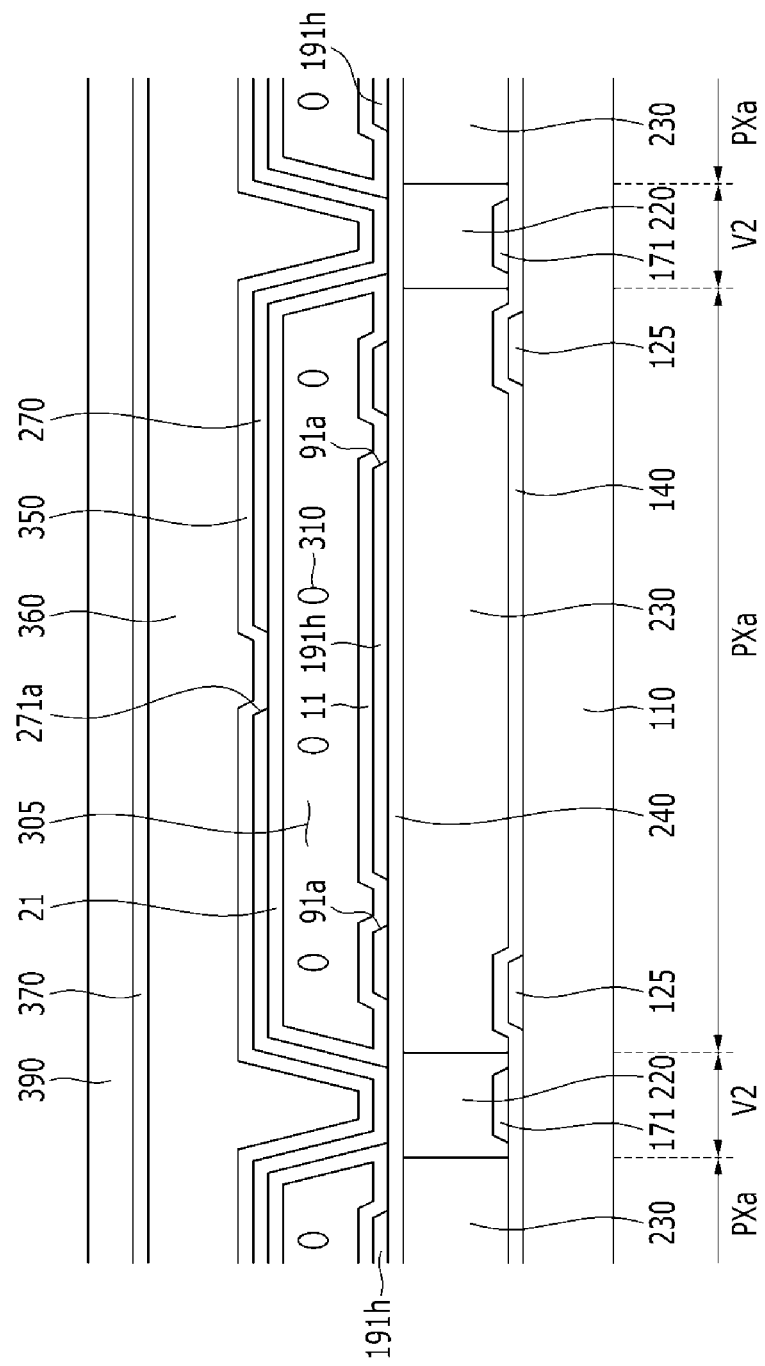
FIG. 5 is a cross-sectional view taken along line V-V of the display device of FIG. 3.

FIG. 4 is a cross-sectional view taken along line IV-IV of the display device of FIG. 3, and FIG. 5 is a cross-sectional view taken along line V-V of the display device of FIG. 3.

As illustrated in FIGS. 3 to 5, an exemplary embodiment of the display device according to the invention includes a gate conductor disposed on the insulation substrate 110 and including the gate line 121, the step-down gate line 123, the storage electrode line 125, and the like.

The gate line 121 and the step-down gate line 123 extend substantially in a horizontal direction (e.g., the pixel row direction) and transfer gate signals. In an exemplary embodiment, the gate line 121 includes a first gate electrode 124h and a second gate electrode 124l protruding upward and downward from the extending direction thereof, and the step-down gate line 123 includes a third gate electrode 124c protruding upward from the extending direction thereof. In an exemplary embodiment, the first gate electrode 124h and the second gate electrode 124l may be connected with each other to define a single protrusion, as shown in FIG. 3. However, the shape and directions of the protrusions of the first, second and third gate electrodes 124h, 124l and 124c are not limited to the shape and directions shown in FIG. 3. In an alternative exemplary embodiment, the shape and direction of the protrusions of the first, second and third gate electrodes 124h, 124l and 124c may be variously modified.

The storage electrode line 125 extends substantially in the horizontal direction and transfers a predetermined voltage such as common voltage. The storage electrode line 125 includes a portion which protrudes upward and downward from the extending direction thereof to surround an edge of the pixel area, e.g., a capacitor electrode 126 protruding downward.

A gate insulating layer 140 is disposed on the gate conductors 121, 123 and 125. In an exemplary embodiment, the gate insulating layer 140 may include an inorganic insulating material such as silicon nitride (SiNx) and silicon oxide (SiOx), for example. In an exemplary embodiment, the gate insulating layer 140 may have a single layer structure or a multiple layer structure.

A first semiconductor 154h, a second semiconductor 154l and a third semiconductor 154c are disposed on the gate insulating layer 140. The first semiconductor 154h may be disposed on the first gate electrode 124h, the second semiconductor 154l may be disposed on the second gate electrode 124i, and the third semiconductor 154c may be disposed on the third gate electrode 124c. The first semiconductor 154h and the second semiconductor 154l may be connected to each other, and the second semiconductor 154l and the third semiconductor 154c may be connected to each other. In such an embodiment, the first semiconductor 154h may extend to a lower portion of the data line 171. The first to third semiconductors 154h, 154l and 154c may include amorphous silicon, polycrystalline silicon, metal oxide, and the like, for example.

An ohmic contact (not illustrated) may be disposed on each of the first to third semiconductors 154h, 154l and 154c.

A data conductor including a data line 171, a first source electrode 173h, a second source electrode 173l, a third source electrode 173c, a first drain electrode 175h, a second drain electrode 175l and a third drain electrode 175c is disposed on the first to third semiconductors 154h, 154l and 154c.

The data line 171 transfers a data signal and extends substantially in a vertical direction (e.g., a pixel column direction) crossing the gate line 121 and the step-down gate line 123.

The first source electrode 173h protrudes from the data line 171 and disposed on the first gate electrode 124h, and the second source electrode 173l is disposed on the second gate electrode 124l. The first source electrode 173h and the second source electrode 173l are connected to each other and receive substantially the same data signal from the data line 171.

Each of the first drain electrode 175h, the second drain electrode 175l and the third drain electrode 175c include a wide end portion and a rod-shaped end portion. The rod-shaped end portions of the first drain electrode 175h and the second drain electrode 175l are partially surrounded by the first source electrode 173h and the second source electrode 173l. The wide end portion of the second drain electrode 175l is further extends to a third source electrode 173c which is bent in a U-like shape. The wide end portion 177c of the third drain electrode 175c overlaps the capacitor electrode 126 and thereby defines the step-down capacitor Cstd, and the rod-shaped end portion of the third drain electrode 175c is partially surrounded by the third source electrode 173c.

The first/second/third gate electrodes 124h/124l/124c, the first/second/third source electrodes 173h/173l/173c, and the first/second/third drain electrodes 175h/175l/175c collectively define first/second/third thin film transistors Qh/Ql/Qc together with the first/second/third semiconductors 154h/154l/154c, respectively, and channels of the first/second/third thin film transistors Qh/Ql/Qc are formed in the respective semiconductors 154h/154l/154c between the respective source electrodes 173h/173l/173c and the respective drain electrodes 175h/175l/175c.

A passivation layer 180 is disposed on the data conductor 171, 173h, 173l, 173c, 175h, 175l and 175c, and on the semiconductors 154h, 154l and 154c exposed between the respective source electrodes 173h/173l/173c and the respective drain electrodes 175h/175l/175c. The passivation layer 180 may include an organic insulating material or an inorganic insulating material, for example, and may have a single layer structure or a multiple layer structure.

A color filter 230 in each pixel area PX is disposed on the passivation layer 180. Each color filter 230 may display one of primary colors such as three primary colors of red, green and blue, for example. The color filter 230 is not limited to the three primary colors of red, green and blue, but may display cyan, magenta, yellow and white-based colors in an alternative exemplary embodiment. In an alternative exemplary embodiment, the color filter 230 may be elongated in a column direction along a space between the adjacent data lines 171.

A light blocking member 220 is disposed in a region between the adjacent color filters 230. The light blocking member 220 is disposed on a boundary of the pixel area PX and the thin film transistor such that light leakage is effectively prevented. In an exemplary embodiment, the light blocking member 220 may be disposed at the first valley V1 and the second valley V2. The color filter 230 and the light blocking member 220 may at least partially overlap each other.

In an exemplary embodiment, a first insulating layer 240 may be disposed on the color filter 230 and the light blocking member 220. The first insulating layer 240 may include an inorganic insulating material such as silicon nitride (SiNx) and silicon oxide (SiOx), for example. In such an embodiment, the first insulating layer 240 protects the color filter 230 and the light blocking member 220, which include the organic materials. In an alternative exemplary embodiment, the first insulating layer 240 may be omitted.

A plurality of first contact holes 185h and a plurality of second contact holes 185l, which expose the wide end portion of the first drain electrode 175h and the wide end portion of the second drain electrode 175l, respectively, are formed through the first insulating layer 240, the light blocking member 220 and the passivation layer 180.

A pixel electrode 191 is disposed on the first insulating layer 240. In an exemplary embodiment, the pixel electrode 191 includes cutouts 91a and 91b, which are adjacent to at least a portion of an edge of the pixel electrode 191 and formed along the edge thereof. In such an embodiment, a fringe field is generated in the edge of the pixel area by the cutouts 91a and 91b formed along the edge of the pixel electrode 191 such that the liquid crystal molecules are effectively controlled to be aligned in a predetermined direction. The pixel electrode 191 may include a transparent metal material such as indium tin oxide ("ITO") and indium zinc oxide ("IZO"), for example.

The pixel electrode 191 includes the first subpixel electrode 191h and the second subpixel electrode 191l, which are spaced apart from each other with the gate line 121 and the step-down gate line 123 therebetween. In an exemplary embodiment, the first subpixel electrode 191h and the second subpixel electrode 191l are disposed in an upper portion and lower portion of the pixel area PX, respectively, with respect to the gate line 121 and the step-down gate line 123 and adjacent to each other in the pixel column direction. In such an embodiment, the first subpixel electrode 191h and the second subpixel electrode 191l are disposed apart from each other with the first valley V1 therebetween, the first subpixel electrode 191h is disposed in the first subpixel area PXa, and the second subpixel electrode 191l is disposed in the second subpixel area PXb.

The first subpixel electrode 191h and the second subpixel electrode 191l are connected to the first drain electrode 175h and the second drain electrode 175l through the first contact hole 185h and the second contact hole 185l, respectively. In such an embodiment, when the first thin film transistor Qh and the second thin film transistor Ql are turned on, the first thin film transistor Qh and the second thin film transistor Ql receive data voltages from the first drain electrode 175h and the second drain electrode 175l.

The shape of the pixel electrode 191 is not limited to the shape of the pixel electrode 191 illustrated in FIG. 2, but may be variously modified.

A common electrode 270 is disposed on the pixel electrode 191 spaced apart from the pixel electrode 191 at a predetermined distance, e.g., a regular predetermined distance. In such an embodiment, a microcavity 305 is defined between the pixel electrode 191 and the common electrode 270. A width and an area of the microcavity 305 may be variously changed based on resolution of the display device.

The common electrode 270 may include a transparent metal material such as ITO and IZO, for example. A predetermined voltage may be applied to the common electrode 270, and an electric field may be thereby generated between the pixel electrode 191 and the common electrode 270.

In an exemplary embodiment, cutouts 271a and 271b are defined in the common electrode 270. The cutouts 271a and 271b include a first cutout 271a formed in the first subpixel area PXa and a second cutout 271b formed in the second subpixel area PXb. The first cutout 271a overlaps the first subpixel electrode 191h, and the second cutout 271b overlaps the second subpixel electrode 191l.

In an exemplary embodiment, the first cutout 271a and the second cutout 271b may have a cross shape when viewed from a top view, and ends of the first cutout 271a and the second cutout 271b protrude above the edges of the first subpixel electrode 191h and the second subpixel electrode 191l. In such an embodiment, the fringe field by the edges of the cutouts of the common electrode 270 that protrude above the edge of the pixel electrode are generated near the edge of the pixel area and thus the liquid crystal molecules in the edge of the pixel area may be effectively controlled to be aligned in a predetermined direction even.

Widths of the first cutout 271a and the second cutout 271b may be less than or equal to about three times the height of the microcavity 305, that is, a cell gap.

The first subpixel electrode 191h and the second subpixel electrode 191l may be divided into a plurality of subregions by the first cutout 271a and the second cutout 271b, and the edges of the first subpixel electrode 191h and the second subpixel electrode 191l.

A liquid crystal layer including the liquid crystal molecules 310 is disposed in the microcavity 305 positioned between the pixel electrode 191 and the common electrode 270. In an exemplary embodiment, the liquid crystal molecules 310 have negative dielectric anisotropy and may aligned substantially in a vertical direction with respect to the substrate 110 when the electric field is not generated therein. In such an embodiment, a vertical alignment may be performed.

A first alignment layer 11 is disposed on the pixel electrode 191. The first alignment layer 11 may be disposed on a portion of the first insulating layer 240 which is exposed by the pixel electrode 191.

A second alignment layer 21 is disposed below the common electrode 270 and faces the first alignment layer 11.

The first alignment layer 11 and the second alignment layer 21 may include vertical alignment layers and may include a material such as polyamic acid, polysiloxane and polyimide, for example. The first and second alignment layers 11 and 21 may be connected to each other at the edge of the pixel area PX.

In an exemplary embodiment, the first subpixel electrode 191h and the second subpixel electrode 191l, to which the data voltages are applied, generate an electric field together with a common electrode 270 to determine directions of the liquid crystal molecules in the microcavity 305 between the pixel and common electrodes 191 and 270. In such an embodiment, luminance of light passing through the liquid crystal layer varies based on the determined directions of the liquid crystal molecules 310.

In an exemplary embodiment, the first subpixel electrode 191h and the common electrode 270 collectively define a first liquid crystal capacitor Clch together with the liquid crystal layer 3 therebetween, and the second subpixel electrode 191l and the common electrode 270 collectively define a second liquid crystal capacitor Clcl together with the liquid crystal layer 3 therebetween. In such an embodiment, the applied voltage is substantially maintained after the first and second thin film transistors Qh and Ql are turned off.

The first and second subpixel electrodes 191h and 191l overlap the storage electrode line 125 to form the first and second storage capacitors Csth and Cstl, and the first and second storage capacitors Csth and Cstl reinforce voltage maintaining capacities of the first and second liquid crystal capacitors Clch and Clcl, respectively.

The capacitor electrode 126 and a wide end portion 177c of the third drain electrode 175c overlap each other with the gate insulating layer 140 therebetween to form the step-down capacitor Cstd.

As describe above, in an exemplary embodiment, the first subpixel electrode 191h and the second subpixel electrode 191l, to which the data voltages are applied, generate the electric field together with the common electrode 270, such that the liquid crystal molecules 310 of the liquid crystal layer, which are aligned substantially vertical with respect to the surfaces of the two electrodes 191 and 270 when the electric field is not generated therein, are tilted substantially in a horizontal direction with respect to the surfaces of the pixel and common electrodes 191 and 270, and luminance of light passing through the liquid crystal layer varies based on the tilted degree of the liquid crystal molecules 310.

In an exemplary embodiment, the liquid crystal layer includes the liquid crystal molecules 310 having negative dielectric anisotropy and a polymer. The liquid crystal molecules 310 have pretilt directions by the polymer such that the longitudinal axes of the liquid crystal molecules 310 are substantially parallel to a direction toward the central portion of the cutouts 271a and 271b of the common electrode 270 having a cross shape from four portions, where the edges of the respective subpixel electrodes 191h and 191l extending in different directions meet, by the cutouts 271a and 271b of the common electrode and the edges of the subpixel electrodes 191h and 191l, and may be aligned substantially vertical with respect to the surface of the substrate 110. Accordingly, each of the first and second subpixels has four subregions having different pretilt directions of the liquid crystal molecules 310.

The microcavity 305 is surrounded by the pixel electrode 191 and the common electrode 270.

In an exemplary embodiment, the common electrode 270 may be disposed directly on the first insulating layer 240 in the second valley V2, and the common electrode 270 may cover a left side and a right side of the microcavity 305. In such an embodiment, the common electrodes 270 are connected to each other along the pixel rows, and the microcavity 305 is not disposed below the common electrodes 270 positioned at the second valley V2 such that a height of the common electrode 270 positioned at the second valley V2 may be less than about a height of the common electrode positioned in the pixel area PX.

In an exemplary embodiment, the common electrode 270 exposes at least a portion of the first valley V1. In such an embodiment, the common electrode 270 does not cover at least a portion of the upper side and the lower side of the pixel area PX and thus a portion of the microcavity 305 is exposed by the common electrode 270. The side where the microcavity 305 is exposed is also referred to as a liquid crystal injection hole 307. The liquid crystal injection hole 307 is formed along the first valley V1, and the liquid crystal material may be injected into the microcavity 305 through the liquid crystal injection hole 307.

In an exemplary embodiment, as described above, the common electrode 270 covers the left side and the right side of the microcavity 305 and does not cover at least a portion of the upper side and the lower side, but the invention is not limited thereto. In an alternative exemplary embodiment, the common electrode 270 may cover a different side of the microcavity 305. In one exemplary embodiment, for example, the common electrode 270 may cover the upper side and the lower side of the microcavity 305 and not cover at least a portion of the left side and the right side. In such an embodiment, the liquid crystal injection hole 307 may be formed along the second valley V2.

In an exemplary embodiment, a second insulating layer 350 may be disposed on the common electrode 270. The second insulating layer 350 may include an inorganic insulating material such as silicon nitride (SiNx) and silicon oxide (SiOx), for example. In an alternative exemplary embodiment, the second insulating layer 350 may be omitted.

In an exemplary embodiment, a roof layer 360 is disposed on the second insulating layer 350. The roof layer 360 may include an organic material. The microcavity 305 may be disposed below the roof layer 360, and a shape of the microcavity 305 may be maintained by the roof layer 360.

In an exemplary embodiment, a plurality of roof layers 360 are disposed on the second insulating layer 350, and the roof layers 360 may be connected to each other along the pixel rows as the common electrode 270, and the liquid crystal injection hole 307 may be formed along the first valley V1 in the roof layer 360 such that a portion of the microcavity 305 is exposed outside.

In an exemplary embodiment, a third insulating layer 370 may be disposed on the roof layer 360. The third insulating layer 370 may include an inorganic insulating material such as silicon nitride (SiNx) and silicon oxide (SiOx), for example. In an exemplary embodiment, the third insulating layer 370 may cover the upper side and the side of the roof layer 360. In such an embodiment, the third insulating layer 370 protects the roof layer 360 including an organic material. In an alternative exemplary embodiment, the third insulating layer 370 may be omitted.

In an exemplary embodiment, an encapsulation layer 390 may be disposed on the third insulating layer 370. The encapsulation layer 390 may cover the liquid crystal injection hole 307 where a portion of the microcavity 305 is exposed outside. In such an embodiment, the encapsulation layer 390 may seal the microcavity 305 such that the liquid crystal molecules 310 in the microcavity 305 are not discharged through the liquid crystal injection hole 307. In an exemplary embodiment, where the encapsulation layer 390 contacts the liquid crystal molecules 310, the encapsulation layer 390 may include a material which does not react with the liquid crystal molecules 310. In one exemplary embodiment, for example, the encapsulation layer 390 may include parylene and the like.

The encapsulation layer 390 may have a multilayer structure such as a double layer structure or a triple layer structure. The double layer structure may include two layers including different materials, respectively. The triple layer structure may include three layers, and materials of adjacent layers in the triple layer structure are different from each other. In one exemplary embodiment, for example, the encapsulation layer 390 may include a layer including an organic insulating material and a layer including an inorganic insulating material.

In an exemplary embodiment, polarizers (not shown) may be disposed on the upper and lower sides of the display device. In an exemplary embodiment, the polarizers may include a first polarizer and a second polarizer. In such an embodiment, the first polarizer may be attached onto the lower side of the substrate 110, and the second polarizer may be attached onto the encapsulation layer 390.

Hereinafter, a unit area of the field generating electrode of an exemplary embodiment of the display device according to the invention will be described with reference to FIG. 6.

Figure 6:
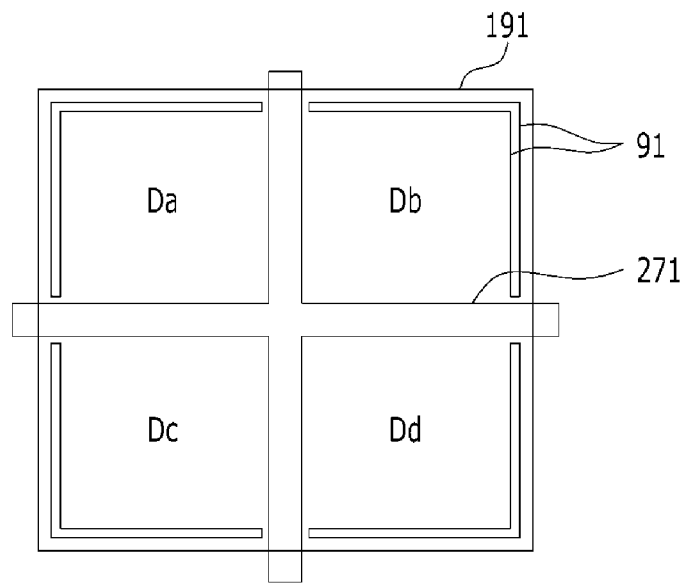
FIG. 6 is a plan view illustrating a unit area of a field generating electrode of an exemplary embodiment of the display device according to the invention.

FIG. 6 is a plan view illustrating a unit area of a field generating electrode of an exemplary embodiment of the display device according the invention.

As illustrated in FIG. 6, the unit area of the field generating electrode is defined by a pixel electrode 191 facing the cutout 271 of the common electrode 270, and a cutout 91 of the pixel electrode 191 surrounding the cutout 271 of the common electrode 270. When viewed from a top view, the unit area defined by the cutout 271 of the common electrode 270 and the edge of the pixel electrode 191 may be divided into a plurality of sub-regions Da, Db, Dc and Dd, and the sub-regions Da, Db, Dc and Dd may be substantially symmetric to each other with respect to the cutout 271 of the common electrode 270.

In such an embodiment, as described above, the cutout 271 of the common electrode 270 may have a cross shape when viewed from a top view, and an end of the cutout 271 protrudes over an edge of the corresponding pixel electrode 191. In an exemplary embodiment, a width of the cutout 271 of the common electrode 270 may be about 2 micrometers (µm) to about 10 micrometers (µm).

In an exemplary embodiment, as shown in FIG. 6, the cutout 91 of the pixel electrode 191 may have a substantially quadrangular ring shape along the edge of the pixel electrode 191, and disconnected around a portion corresponding to an end of the cutout 271 of the common electrode 270. In such an embodiment, the disconnected portion of the cutout 91 in the pixel electrode 191 may be a connecting portion of the pixel electrode. A width of the connecting portion of the pixel electrode may be greater than a width of the cutout 271 of the corresponding common electrode 270.

The cutout 91 of the pixel electrode 191 may be spaced apart from the edge of the pixel electrode 191 at a distance that is less than or equal to about twice the cell gap of the display device, and the width of the cutout 91 may be less than or equal to about twice the cell gap of the display device.

The width of the cross-shaped cutout 271 may be less than or equal to about three times the thickness of the liquid crystal layer, that is, the cell gap.

In an exemplary embodiment of the display device, as shown in FIG. 6, the cross-shaped cutout is defined on the common electrode, but not being limited thereto. In an alternative exemplary embodiment, the cross-shaped cutout may be formed on at least one of the pixel electrode and the common electrode which are the field generating electrodes. In one exemplary embodiment, for example, the cross-shaped cutout may be formed on the pixel electrode, or may be formed on both the pixel electrode and the common electrode.

Figure 7:
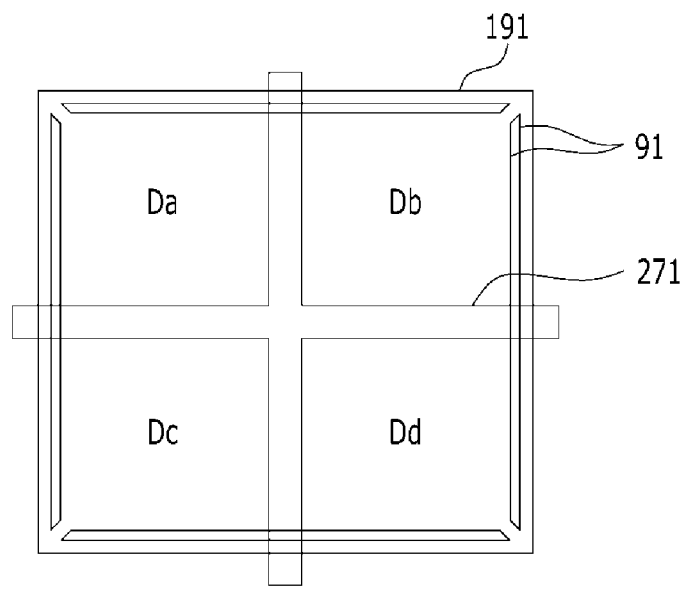
FIG. 7 is a plan view illustrating a unit area of a field generating electrode of an alternative exemplary embodiment of a display device according to the invention.

Then, a unit area of a field generating electrode of an alternative exemplary embodiment of a display device according to the invention will be described with reference to FIG. 7. FIG. 7 is a plan view illustrating a unit area of a field generating electrode of an alternative exemplary embodiment of a display device according to the invention.

As illustrated in FIG. 7, the unit area of the field generating electrode may be defined by a pixel electrode 191 facing the cutout 271 of the common electrode 270, and a cutout 91 of the pixel electrode 191 surrounding the cutout 271 of the common electrode 270. When viewed from a top view, the unit area defined by the cutout 271 of the common electrode 270 and the edge of the pixel electrode 191 may be divided into a plurality of sub-regions Da, Db, Dc and Dd, and the sub-regions may be substantially symmetric to each other with respect to the cutout 271 of the common electrode 270.

In an exemplary embodiment, as described above, the cutout 271 of the common electrode 270 may have a cross shape when viewed from a top view, and an end of the cutout 271 protrudes over an edge of the corresponding pixel electrode 191. In an exemplary embodiment, a width of the cutout 271 of the common electrode 270 may be about 2 µm to about 10 µm.

The cutout 91 of the pixel electrode 191 may have a substantially quadrangular ring shape along the edge of the pixel electrode 191, and disconnected at four portions where the edges of the pixel electrode 191 extending in different directions meet, that is, at portions adjacent to corner portions of the pixel electrode 191. In such an embodiment, the disconnected portion of the cutout 91 formed on the pixel electrode 191 becomes a connecting portion of the pixel electrode. In an exemplary embodiment, as illustrated in FIG. 7, the cutout 91 of the pixel electrode 191 may partially overlap the cutout 271 of the common electrode 270.

In such an embodiment, the cutout 91 of the pixel electrode 191 may be spaced apart from the edge of the pixel electrode 191 at a distance which is less than or equal to about twice the cell gap of the display device, and the width of the cutout 91 may be less than or equal to about the cell gap of the display device.

The width of the cross-shaped cutout 271 may be less than or equal to about three times the thickness of the liquid crystal layer, that is, the cell gap.

In an exemplary embodiment of the display device, as shown in FIG. 7, the cross-shaped cutout is formed on the common electrode, but not being limited thereto. In an alternative exemplary embodiment, the cross-shaped cutout may be formed on at least one of the pixel electrode and the common electrode which are the field generating electrodes. In one exemplary embodiment, for example, the cross-shaped cutout may be formed on the pixel electrode, or may be formed on both the pixel electrode and the common electrode.

Figure 8:
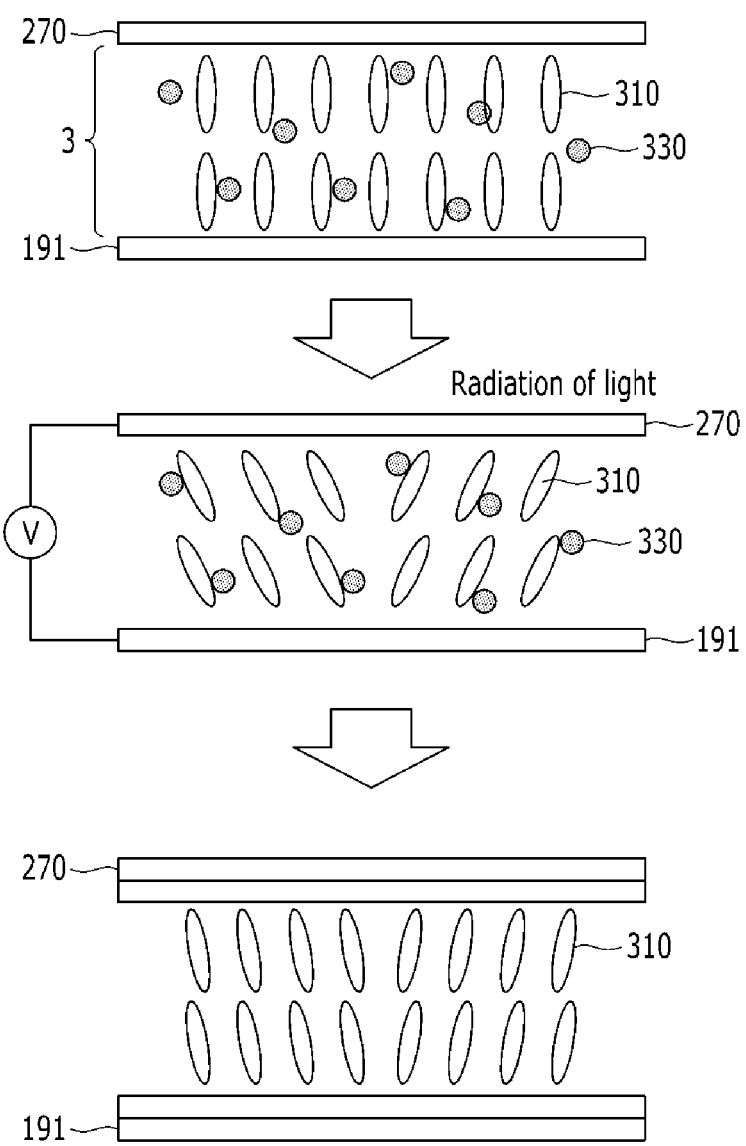
FIG. 8 is a diagram illustrating an exemplary embodiment of a process in which liquid crystal molecules have pretilt directions using prepolymers polymerized by light such as ultraviolet light.

Now, an exemplary embodiment of a method of initially aligning the liquid crystal molecules 310 to have pretilt directions will be described with reference to FIGS. 8 and 9. FIG. 8 is a diagram illustrating an exemplary embodiment of a process in which liquid crystal molecules have pretilt directions using prepolymers that is polymerized by light such as ultraviolet light, and FIGS. 9A and 9B schematically illustrate directions of the liquid crystal molecules in the unit area of the field generating electrode of an exemplary embodiment of the display device according to the invention.

In an exemplary embodiment, prepolymers 330 such as monomers that are cured by polymerization by light such as ultraviolet light are injected into the microcavity 305 through the liquid crystal injection hole 307 together with a liquid crystal material. In such an embodiment, the prepolymers 330 may be included in the liquid crystal layer and the alignment layers 11 and 21. The prepolymers 330 may be reactive mesogen polymerized by the light such as ultraviolet light.

Then, data voltages are applied to the first and second subpixel electrodes 191h and 191l, and a common voltage is applied to the common electrode 270 such that an electric field is generated in the liquid crystal layer 3 between the two field generating electrodes. Then, the liquid crystal molecules 310 of the liquid crystal layer 3 are tilted in a direction substantially parallel to a direction toward the central portion of the cross-shaped cutout 271 of the common electrode 270 from four portions where edges of the pixel electrode 191 extending in different directions meet, by the fringe field due to the cutout 271 of the common electrode 270 and the edge of the pixel electrode 191, in response to the electric field. In such an embodiment, pretilt directions of the liquid crystal molecules 31 in the unit area of the field generating electrode may have four different directions.

Figure 9A:
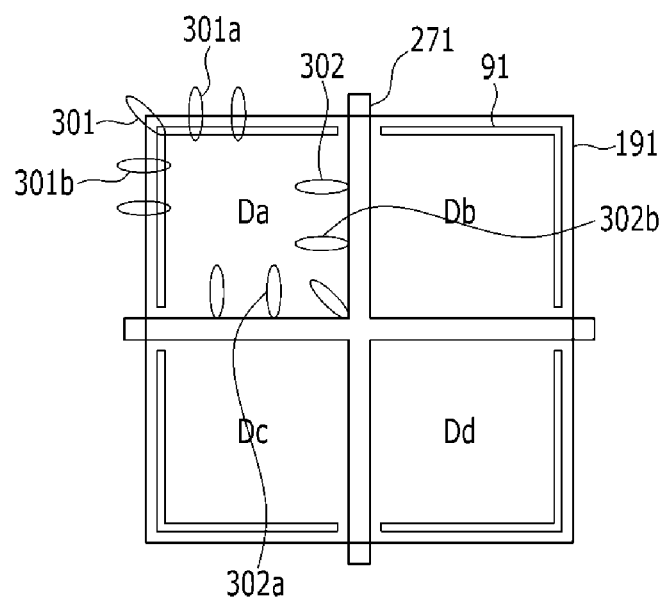
FIGS. 9A and 9B are diagrams schematically illustrating directions of liquid crystal molecules in a unit area of a field generating electrode of an exemplary embodiment of the display device according to the invention.
Figure 9B:
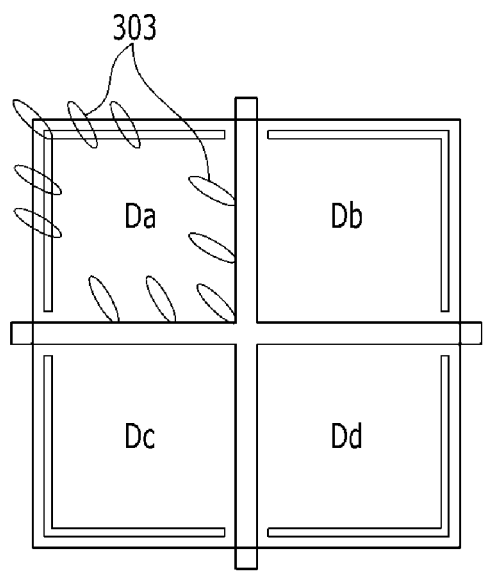

Referring to FIG. 9A, in an exemplary embodiment, directors 301a and 301b of the liquid crystal molecules in the portion adjacent to the edges of the pixel electrode 191 that defines the unit area of the field generating electrode are substantially vertical to the edges of the pixel electrode 191, respectively. In such an embodiment, directors 302a and 302b of the liquid crystal molecules in the portion adjacent to edges of the cutout 271 of the common electrode that defines the unit area of the field generating electrode are substantially vertical to the edges of the cutout 271 of the common electrode 270, respectively. In such an embodiment, the liquid crystal directors 301 and 302 are firstly determined based on the fringe field generated by the edge of the pixel electrode 191, the cutout 91 of the pixel electrode 191, and the cutout 271 of the common electrode, which define the unit area of the field generating electrode, the liquid crystal molecules meet each other to be secondarily aligned in a direction to minimize modification, and the secondary alignment direction becomes a vector sum direction of the directions which the directors 301 and 302 face. Therefore, finally, as illustrated in FIG. 9B, the liquid crystal directors 303 is substantially parallel to the direction toward the central portion of the cross-shaped cutout 271 of the common electrode 270 from the four portions where the edges of the pixel electrode 191 that extend in different directions meet. Accordingly, the directors 303 of the liquid crystal molecules 310 are aligned substantially parallel to each other in each of the sub-regions Da, Db, Dc and Dd by the fringe field, and the tilt directions of the liquid crystal molecules includes four different directions in each unit area of the field generating electrode. In such an embodiment, in a first sub-region Da among the sub-regions, the directors 303 of the liquid crystal molecules 310 are obliquely aligned in a lower right direction to face the central portion of the cutout 271 from the edge of the pixel electrode, and in a second sub-region Db, the directors 303 of the liquid crystal molecules 310 are obliquely aligned in a lower left direction to face the central portion of the cutout 271 from the edge of the pixel electrode. In a third sub-region Dc, the directors 303 of the liquid crystal molecules 310 are obliquely aligned in an upper right direction to face the central portion of the cutout 271 from the edge of the pixel electrode, and in a fourth sub-region Dd, the directors 303 of the liquid crystal molecules 310 are obliquely aligned in an upper left direction to face the central portion of the cutout 271 from the edge of the pixel electrode.

In such an embodiment, the fringe field is not generated in the region corresponding to the cutout 91 of the pixel electrode 191, and a magnitude of the fringe field applied to the edge of the pixel electrode 191 may be controlled by the cutout 91 of the pixel electrode 191, e.g., based on shapes and positions of the cutout 91 of the pixel electrode 191. Therefore, deterioration of display quality, which may occur when the liquid crystal molecules are tilted in the vertical direction to the edge of the pixel electrode 191, is effectively prevented by reducing an effect of the fringe field applied to the liquid crystal molecules 310 which are disposed to be adjacent to the edge of the pixel electrode 191 to control the liquid crystal molecules 310 disposed to be adjacent to the edge of the pixel electrode 191 to be tilted substantially in a vertical direction to the edge of the pixel electrode 191.

Next, an exemplary embodiment of a manufacturing method of a display device according to the invention will now be described with reference to FIGS. 10 to 31, and with reference again to FIG. 3.

FIGS. 10 to 31 are cross-sectional views illustrating an exemplary embodiment of a manufacturing method of a display device according to the invention. FIGS. 10, 12, 14, 16, 18, 20, 22, 24, 26, 28 and 30 are cross-sectional views taken along a same line of a display device. Further, FIGS. 11, 13, 15, 17, 19, 21, 23, 25, 27, 29 and 31 are cross-sectional views taken along a same line of a display device.

Figure 10:
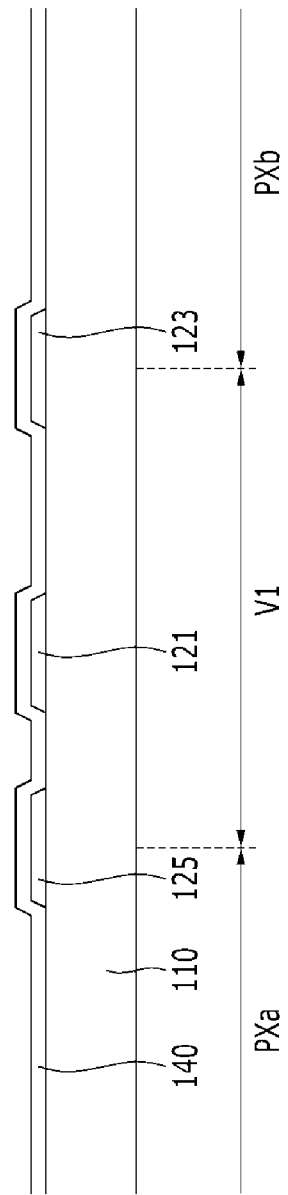
FIGS. 10 to 31 are cross-sectional views illustrating an exemplary embodiment of a manufacturing method of a display device according to the invention.
Figure 11:
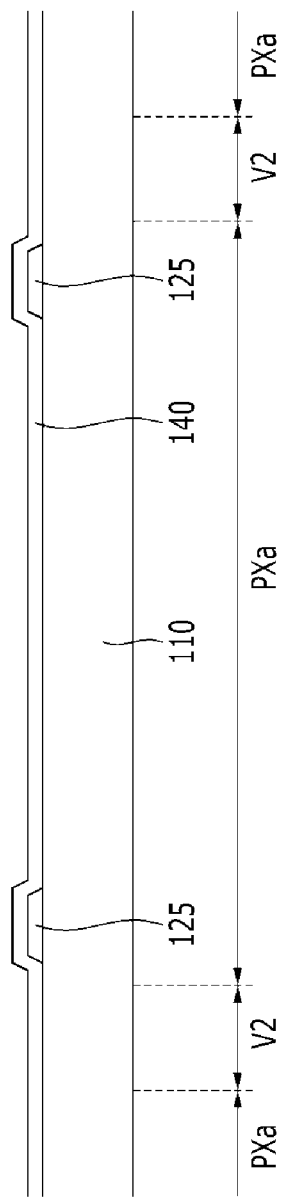

First, as illustrated in FIGS. 10 and 11, a gate line 121 and a step-down gate line 123 extending in a first direction (e.g., the pixel row direction) are provided, e.g., formed, on a substrate 110 including a material such as glass or plastic, for example, and a first gate electrode 124h, a second gate electrode 124l and a third gate electrode 124c, which protrude from the gate line 121, are provided on the substrate 110.

In an exemplary embodiment, the storage electrode line 125 may be provided on the substrate 110 to be spaced apart from the gate line 121, the step-down gate line 123 and the first to third gate electrodes 124h, 124l and 124c.

Next, a gate insulating layer 140 is provided on substantially the entire surface of the substrate 110 including the gate line 121, the step-down gate line 123, the first to third gate electrodes 124h, 124l and 124c, and the storage electrode line 125 using an inorganic insulating material such as silicon oxide (SiOx) or silicon nitride (SiNx), for example. The gate insulating layer 140 may have a single layer structure or a multiple layer structure.

Next, a first semiconductor 154h, a second semiconductor 154l and a third semiconductor 154c are provided on the gate insulating layer 140 by depositing a semiconductor material such as amorphous silicon, polycrystalline silicon and metal oxide, for example, and then patterning the deposited semiconductor material. The first semiconductor 154h may be positioned on the first gate electrode 124h, the second semiconductor 154l may be positioned on the second gate electrode 124l, and the third semiconductor 154c may be positioned on the third gate electrode 124c.

Figure 12:
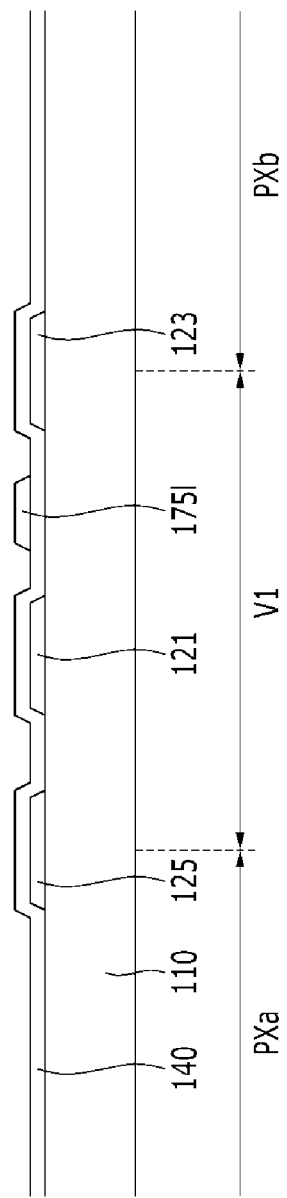
Figure 13:
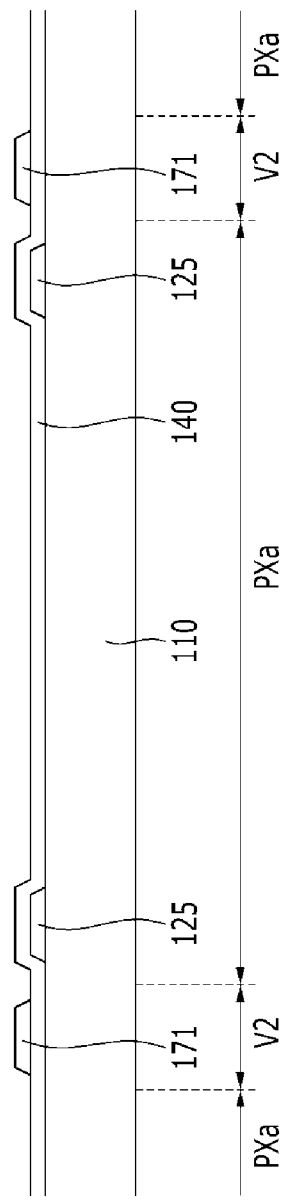

As illustrated in FIGS. 12 and 13, a data line 171 extending in a second direction (e.g., the pixel column direction) is provided on the gate insulating layer 140 by depositing a metallic material, and then patterning the deposited metallic material. The metallic material may have a single layer structure or a multiple layer structure.

In an exemplary embodiment, a first source electrode 173h protruding above the first gate electrode 124h from the data line 171 and a first drain electrode 175h spaced apart from the first source electrode 173h are provided on the gate insulating layer 140. In such an embodiment, a second source electrode 173l connected to the first source electrode 173h and a second drain electrode 175l spaced apart from the second source electrode 173l may be provided together. In such an embodiment, a third source electrode 173c extending from the second drain electrode 175l and a third drain electrode 175c spaced apart from the third source electrode 173c may be provided together.

The first to third semiconductors 154h, 154l and 154c, the data line 171, the first to third source electrodes 173h, 173l and 173c, and the first to third drain electrodes 175h, 175l and 175c may be provided by sequentially depositing the semiconductor material and the metallic material, and then patterning the semiconductor material and the metallic material at the same time. In such an embodiment, the first semiconductor 154h may extend to the lower portion of the data line 171.

The first/second/third gate electrodes 124h/124l/124c, the first/second/third source electrodes 173h/173l/173c, and the first/second/third drain electrodes 175h/175l/175c collectively define first/second/third thin film transistors Qh/Ql/Qc together with the first/second/third semiconductors 154h/154l/154c, respectively.

Figure 14:
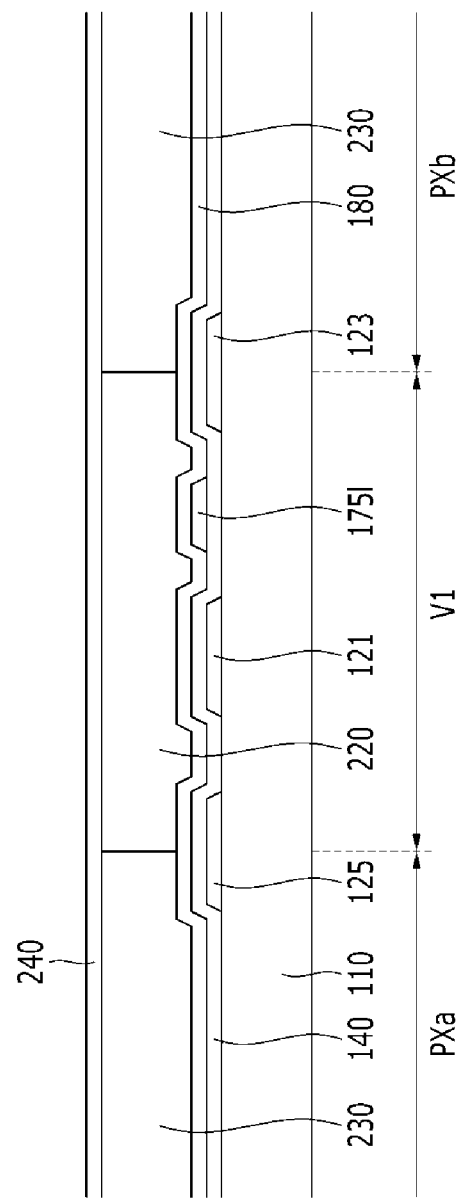
Figure 15:
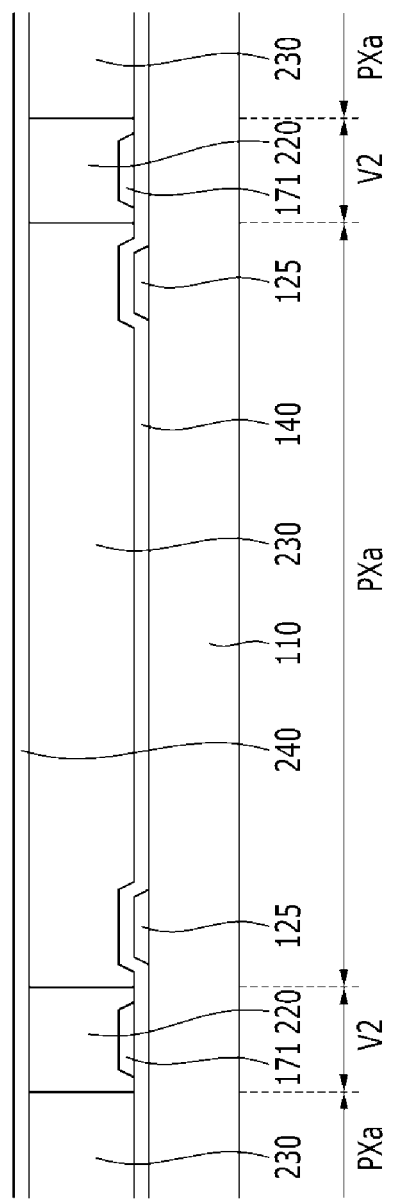

As illustrated in FIGS. 14 and 15, a passivation layer 180 is provided on the data line 171, the first to third source electrodes 173h, 173l and 173c, the first to third drain electrodes 175h, 175l and 175c, and the semiconductors 154h, 154l and 154c exposed between the respective source electrodes 173h/173l/173c and the respective drain electrodes 175h/175l/175c. The passivation layer 180 may include an organic insulating material or an inorganic insulating material, and may have a single layer structure or a multiple layer structure.

Next, a color filter 230 in each pixel area PX is provided on the passivation layer 180. The color filters 230 having a same color may be provided along a column direction of the plurality of pixel areas PX. In an exemplary embodiment, the color filters 230 having three colors may be sequentially provided. In one exemplary embodiment, for example, a first colored color filter 230 may be first provided and then a second colored color filter 230 may be provided by shifting a mask. In such an embodiment, after the second colored color filter 230 is provided, a third colored color filter may be provided by shifting the mask.

Next, a light blocking member 220 is provided on a boundary of each pixel area PX on the passivation layer 180 and the thin film transistor.

In an exemplary embodiment, the light blocking member 220 is provided after providing the color filters 230, but the invention is not limited thereto. In an alternative exemplary embodiment, the light blocking member 220 may be first provided, and then the color filters may be provided.

Next, as shown in FIGS. 14 and 15, a first insulating layer 240 including an inorganic insulating material such as silicon nitride (SiNx) and silicon oxide (SiOx), for example, is provided on the color filter 230 and the light blocking member 220.

Next, a first contact hole 185h that exposes a portion of the first drain electrode 175h and a second contact hole 185l that exposes a portion of the second drain electrode 175l are formed through the passivation layer 180, the light blocking member 220 and the first insulating layer 240 by etching the passivation layer 180, the light blocking member 220 and the first insulating layer 240.

Figure 16:
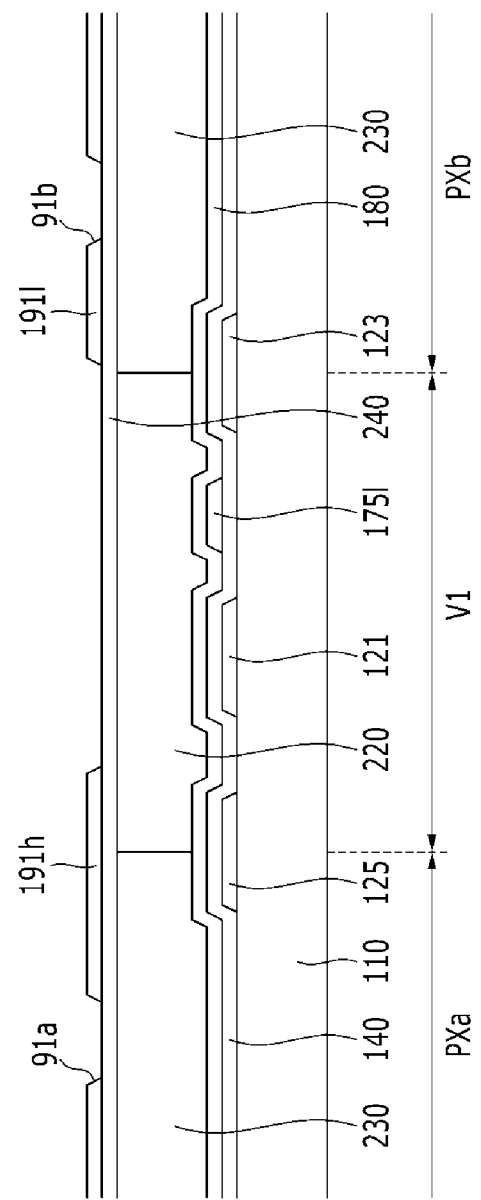
Figure 17:
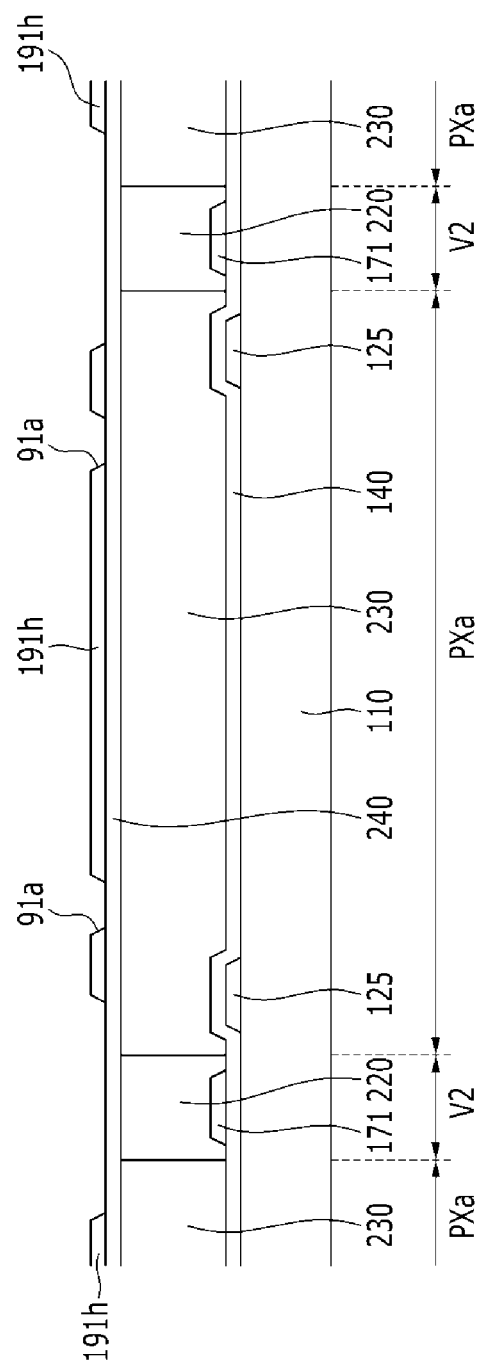

As illustrated in FIGS. 16 and 17, a first subpixel electrode 191h is provided in a first subpixel area PXa, and a second subpixel electrode 191l is provided in a second subpixel area PXb, by depositing and patterning a transparent metal material such as ITO and IZO, for example, on the first insulating layer 240. The first subpixel electrode 191h is connected to the first drain electrode 175h through the first contact hole 185h, and the second subpixel electrode 191l is connected to the second drain electrode 175l through the second contact hole 185l.

In such an embodiment, cutouts 91a and 91b are formed on the first subpixel electrode 191h and the second subpixel electrode 191l, respectively. In such an embodiment, cutouts 91a and 91b are formed along the edge to be adjacent to at least a portion of the edges of the first subpixel electrode 191h and the second subpixel electrode 191l.

Figure 18:
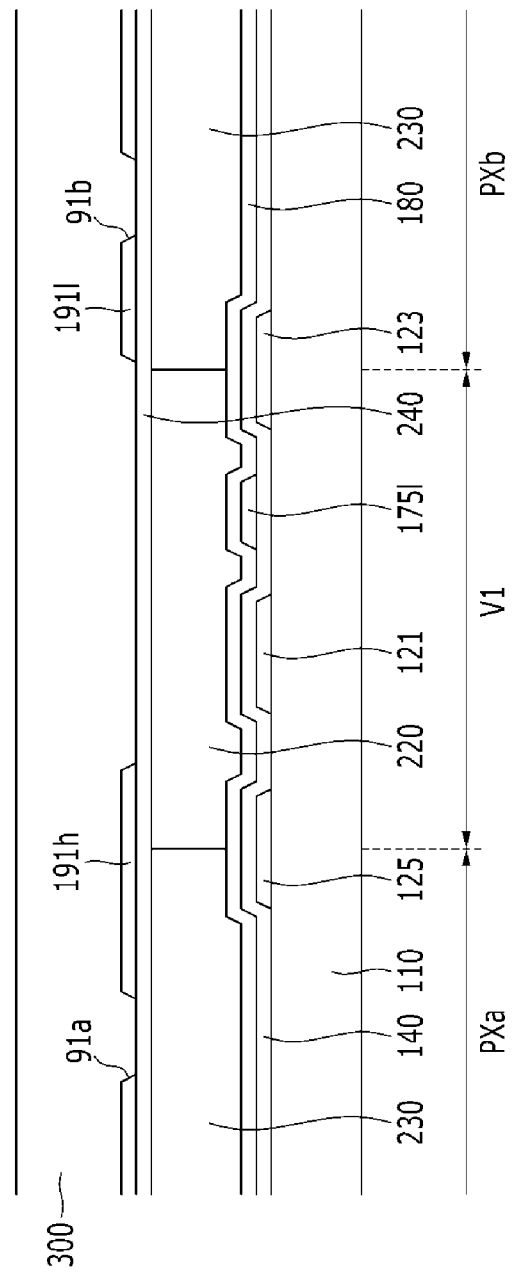
Figure 19:
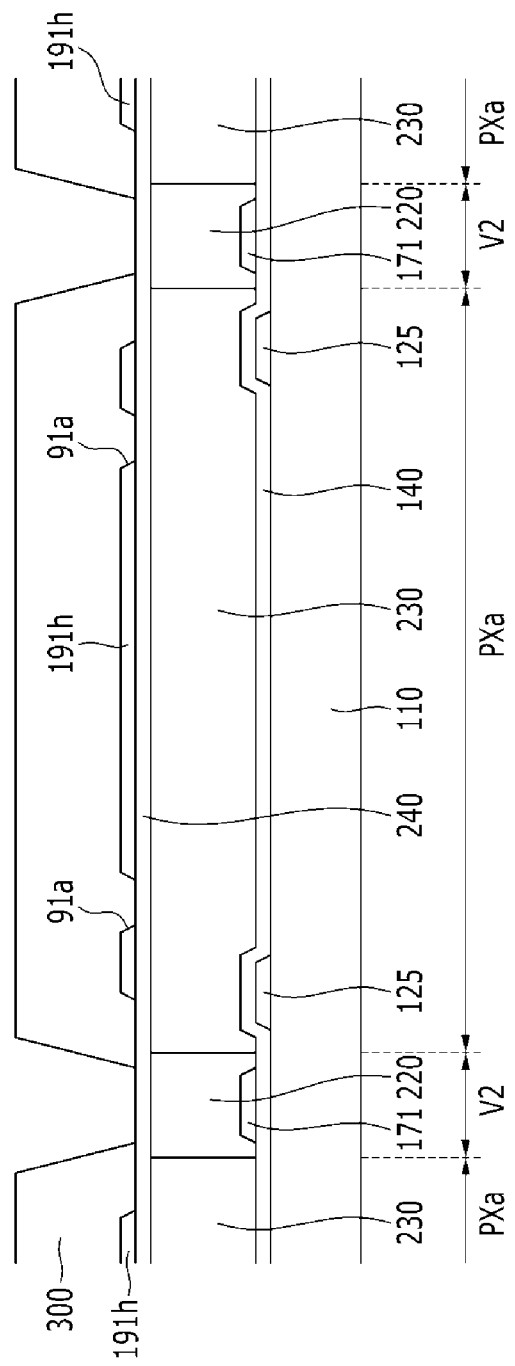

As illustrated in FIGS. 18 and 19, a sacrificial layer 300 is provided on the first and second subpixel electrodes 191h and 191l, and the first insulating layer 240 by coating a photosensitive organic material on the pixel electrode 191 and through a photolithography process. The sacrificial layer 300 may include a positive photosensitive material.

The sacrificial layers 300 are provided to be connected along a plurality of pixel columns. In an exemplary embodiment, the sacrificial layer 300 is provided to cover each pixel area PX and to cover the first valley V1 positioned between the first subpixel area PXa and the second subpixel area PXb.

Next, a curing process is performed on the sacrificial layer 300 by applying predetermined heat.

Figure 20:
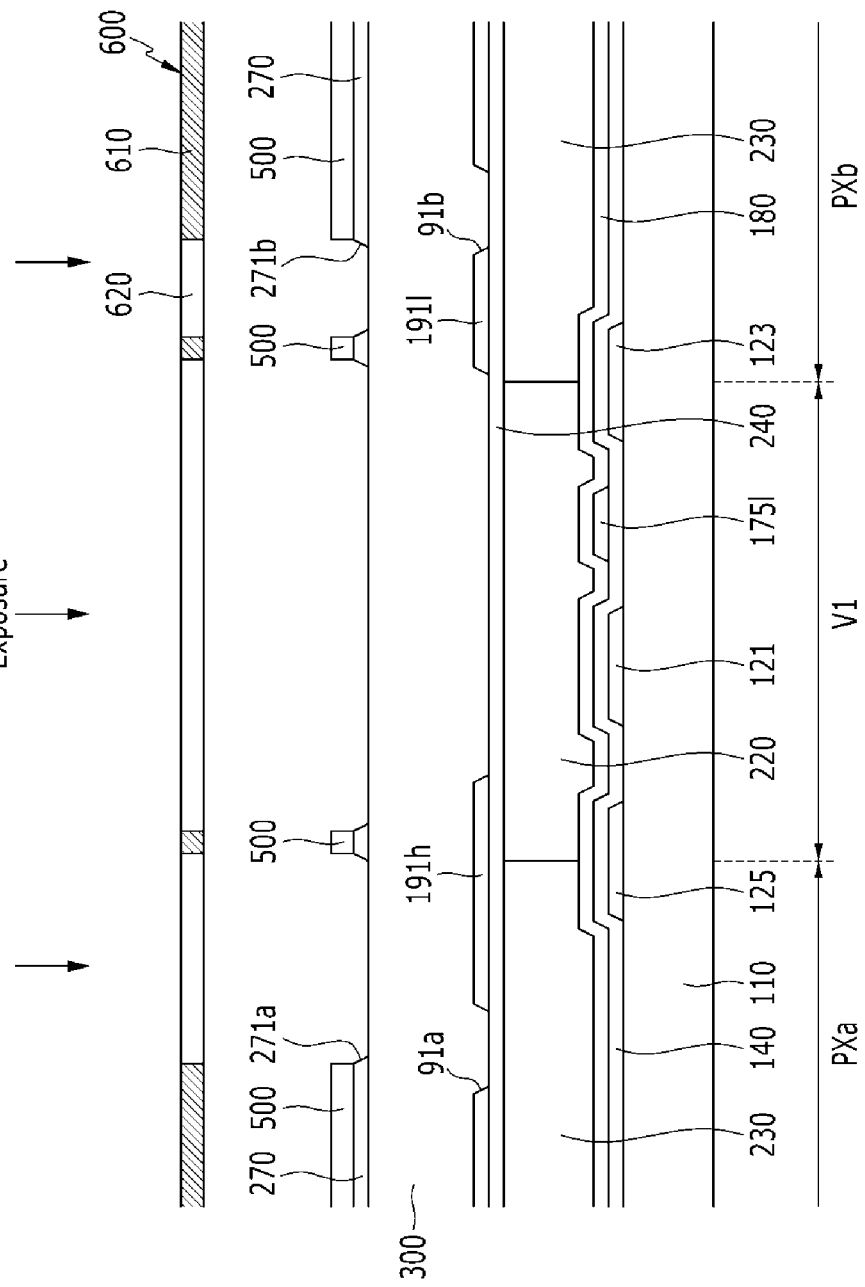
Figure 21:
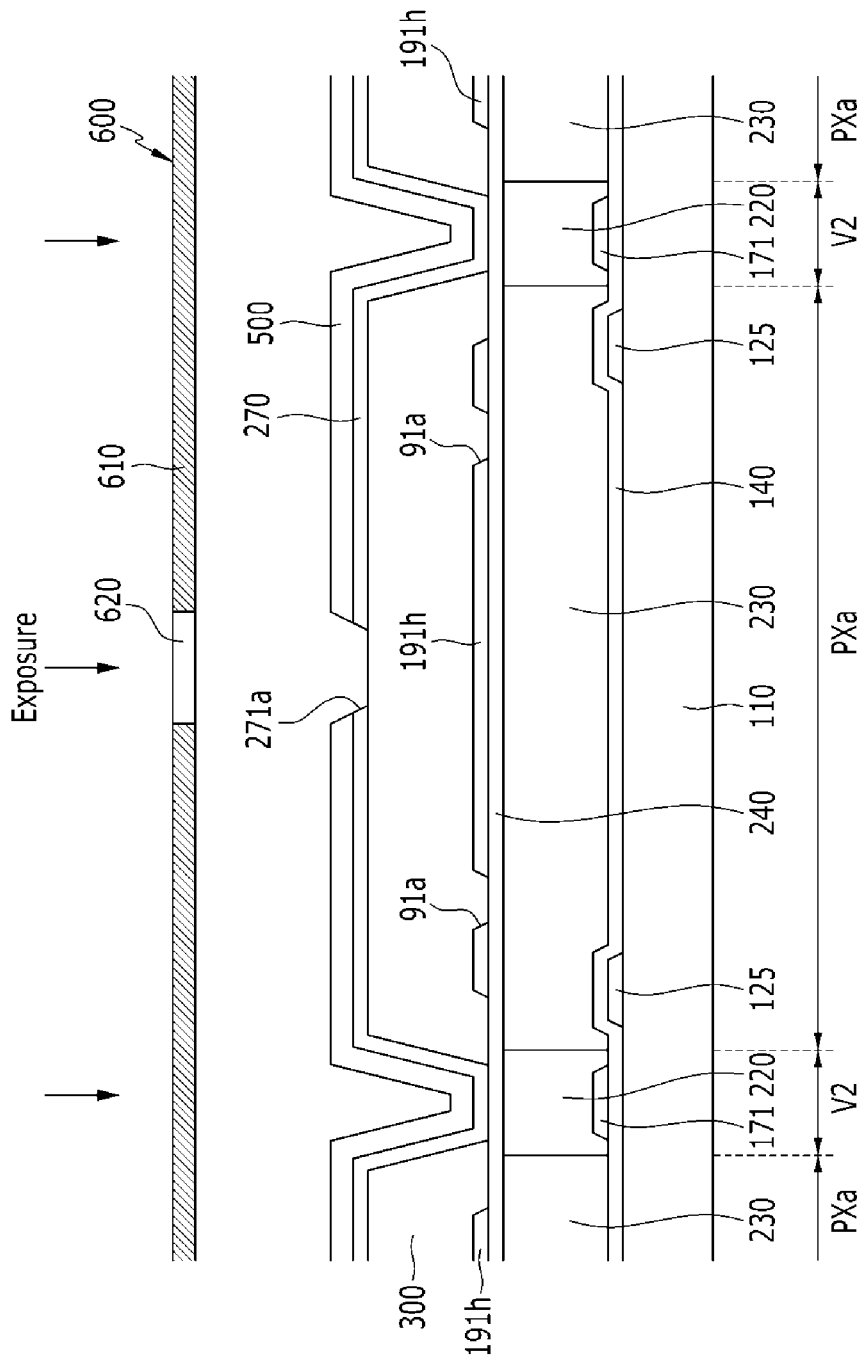

As illustrated in FIGS. 20 and 21, a common electrode 270 is provided by depositing a transparent metal material such as ITO and IZO on the sacrificial layer 300, and a photosensitive film is coated on the common electrode 270. The photosensitive film may include a positive photosensitive material.

Next, a photosensitive film pattern 500 is formed on the substrate 110 by matching a mask 600, and exposing and developing the photosensitive film. The mask 600 includes a non-transmission portion 610 through which blocks light and a transmission portion 620 which allows light to pass there-through in an exposure process. In such an embodiment, where the photosensitive film includes a positive photosensitive material, the photosensitive film of the portion corresponding to the non-transmission portion 610 remains in the developing process and the photosensitive film of the portion corresponding to the transmission portion 620 is removed.

The common electrode 270 is patterned by etching the common electrode 270 using the photosensitive film pattern 500 to form the cutouts 271a and 271b. The common electrode 270 substantially covers each pixel area PX and substantially covers the second valley V2 positioned between the adjacent pixel areas PX. In such an embodiment, the cutouts 271a and 271b include the first cutout 271a formed in the first subpixel area PXa and the second cutout 271b formed in the second subpixel area PXb. The first cutout 271a overlaps the first subpixel electrode 191h, and the second cutout 271b overlaps the second subpixel electrode 191l.

In an exemplary embodiment, the first cutout 271a and the second cutout 271b may have a cross shape when viewed from a top view, and ends of the first cutout 271a and the second cutout 271b protrude over the edges of the first subpixel electrode 191h and the second subpixel electrode 191l, respectively. However, the shapes of the cutouts 271a and 271b in the common electrode 270 are not limited thereto and the cutouts 271a and 271b may be provided in various shapes.

Figure 22:
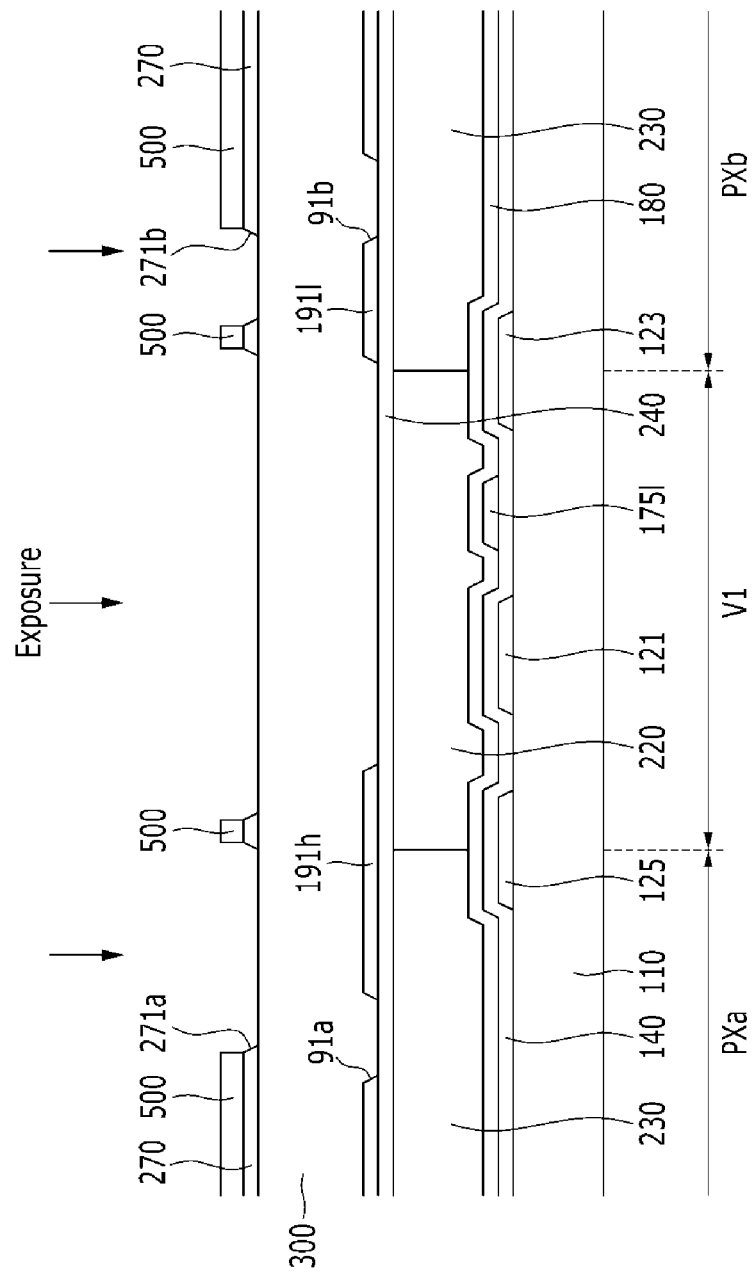
Figure 23:
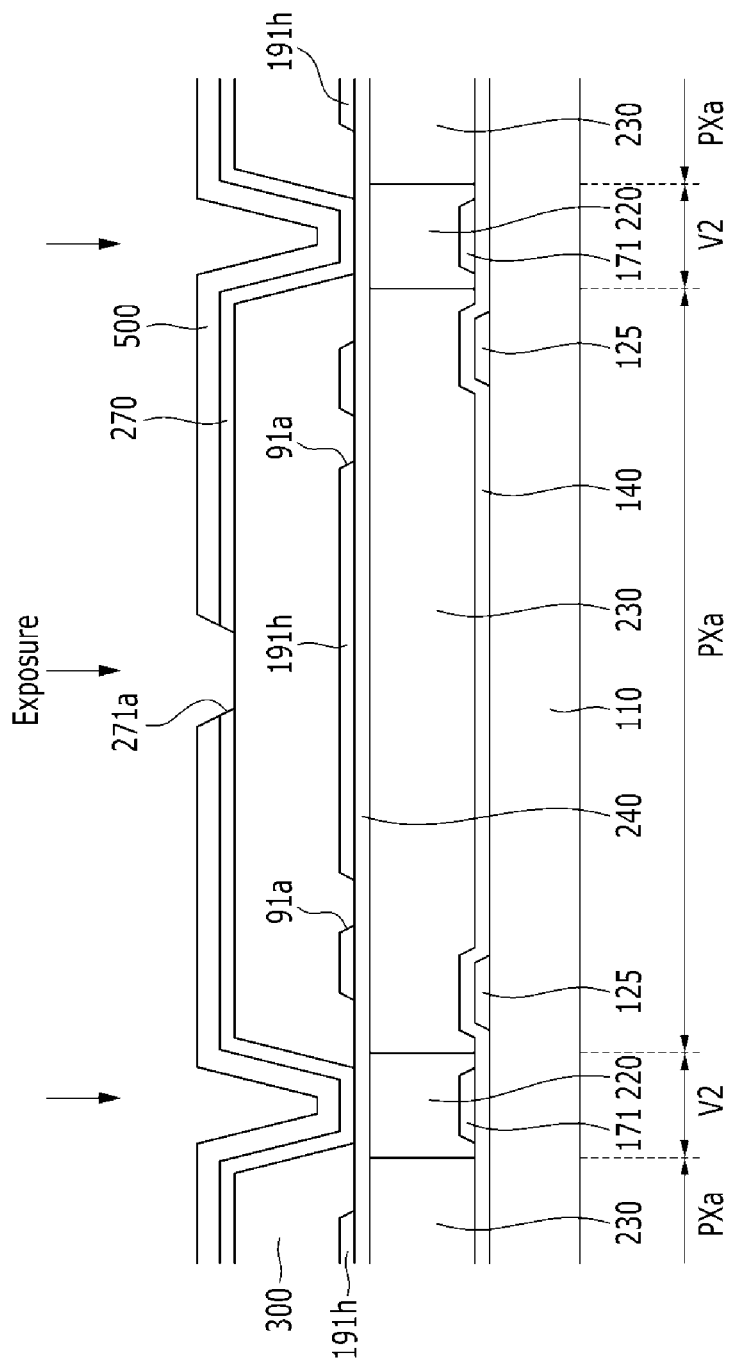

As illustrated in FIGS. 22 and 23, the substantially entire surface of the photosensitive film pattern 500 is exposed and developed, and thus the photosensitive film pattern is removed. In such an embodiment, where the photosensitive film pattern 500 includes the positive photosensitive material, when the substantially entire surface of the photosensitive film pattern 500 is exposed and then developed, the substantially entire photosensitive film pattern 500 is removed.

In an exemplary embodiment, the photosensitive film pattern 500 may be developed using a developer in the removing process thereof. In one exemplary embodiment, for example, the developer may include tetramethyl ammonium hydroxide ("TMAH").

In such an embodiment, a portion of the sacrificial layer 300 is exposed by the developer in the removing process of the photosensitive film pattern 500. In an exemplary embodiment, where the sacrificial layer 300 is subjected to the thermal curing process, the sacrificial layer 300 is not removed by the developer. In such an embodiment, the sacrificial layer 300 is not affected by the removing process of the photosensitive film pattern 500.

Figure 24:
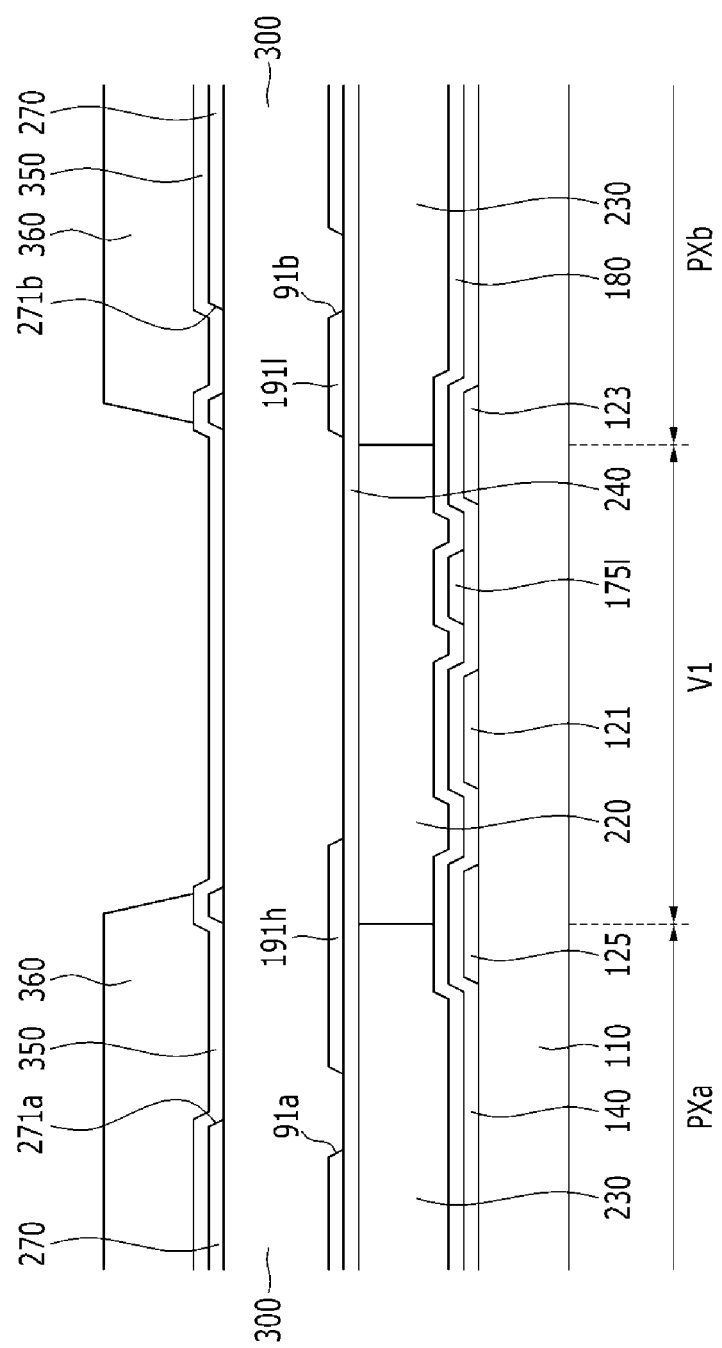
Figure 25:
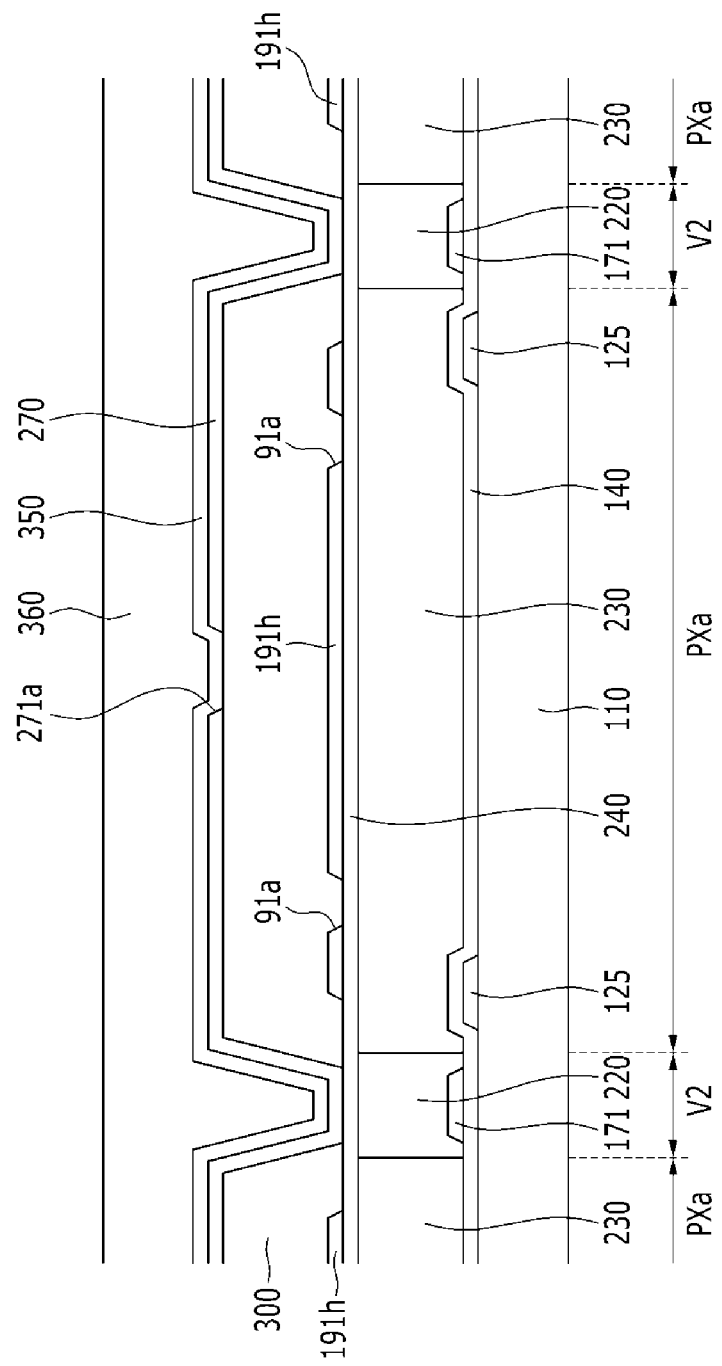

As illustrated in FIGS. 24 and 25, a second insulating layer 350 including an inorganic insulating material such as silicon oxide (SiOx) or silicon nitride (SiNx), for example, may be provided on the common electrode 270.

Next, a roof layer 360 including an organic material is provided on the second insulating layer 350. A portion of the roof layer 360 positioned at the first valley V1 may be removed by patterning the roof layer 360.

Figure 26:
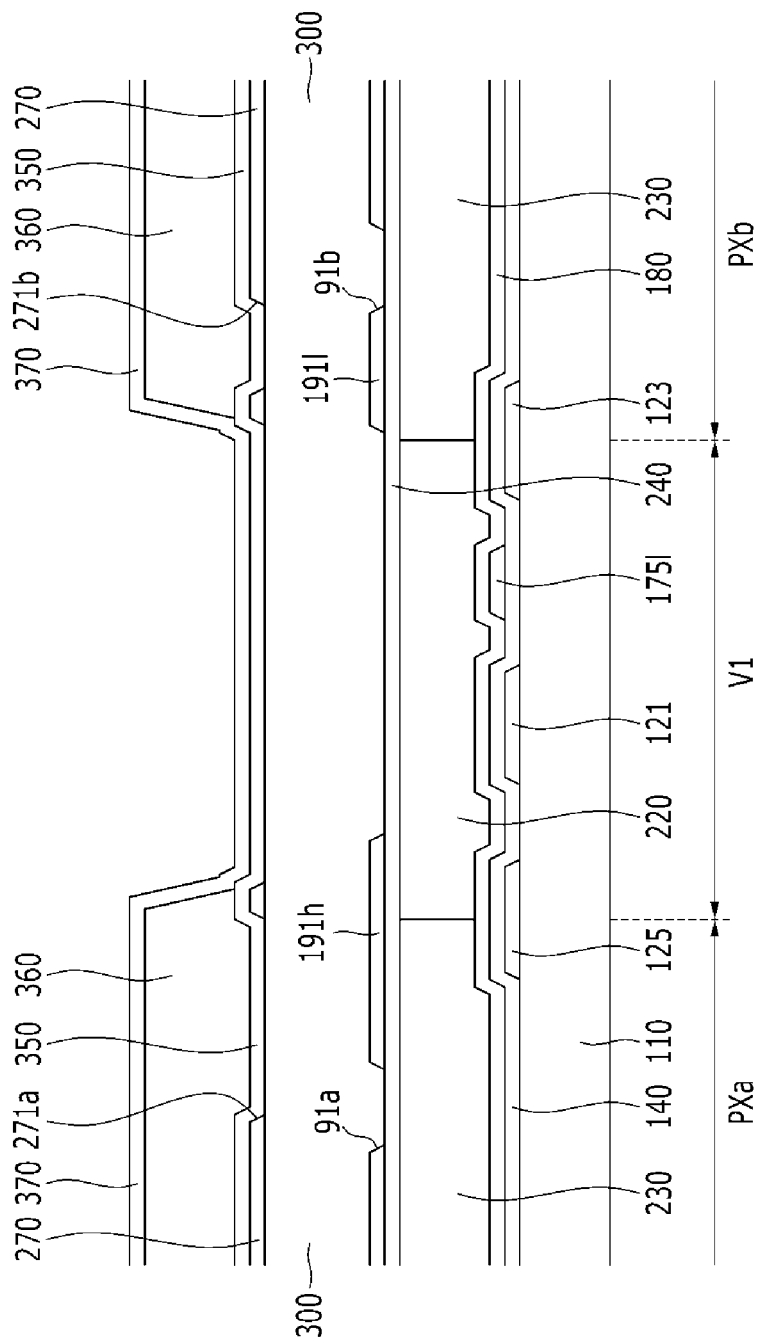
Figure 27:
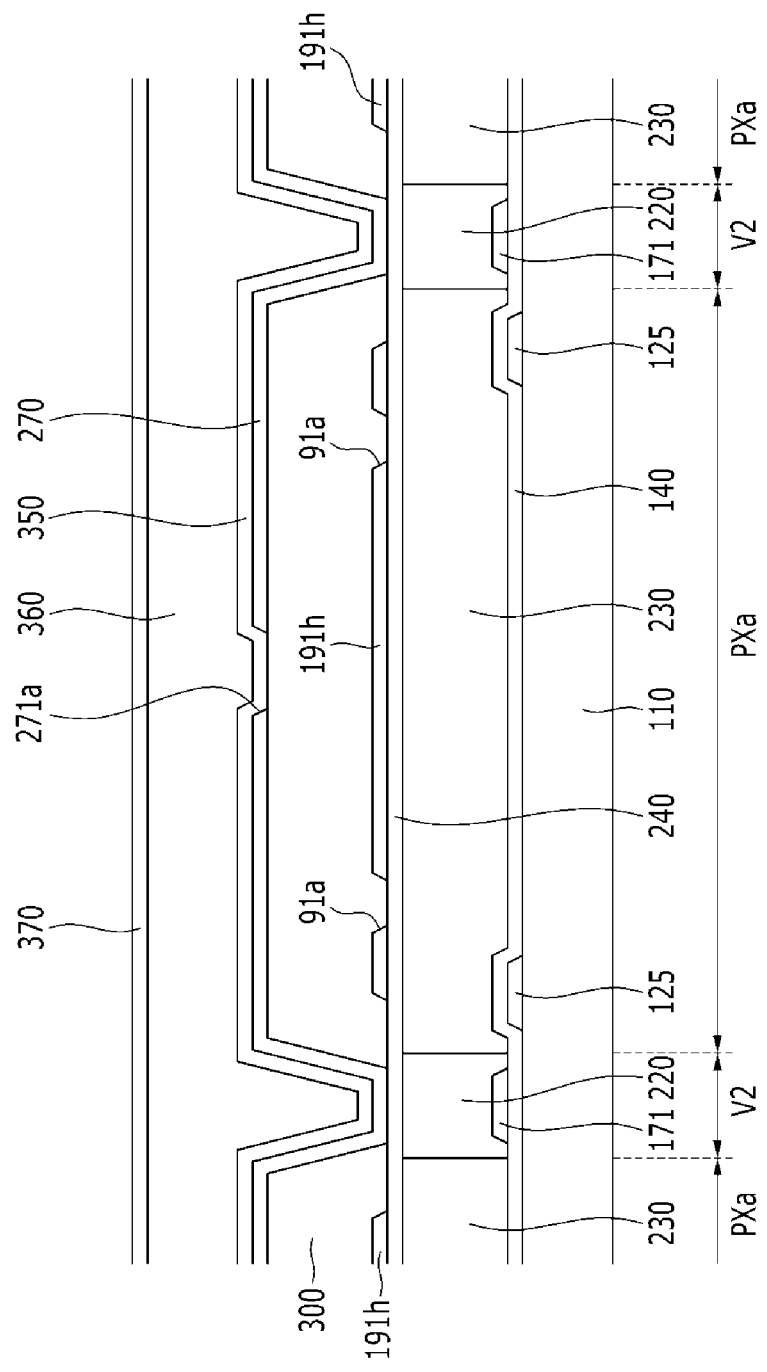

As illustrated in FIGS. 26 and 27, a third insulating layer 370 including an inorganic insulating material such as silicon nitride (SiNx) and silicon oxide (SiOx), for example, may be provided on the roof layer 360. The third insulating layer 370 is provided on the patterned roof layer 360 to cover and protect the side of the roof layer 360.

Figure 28:
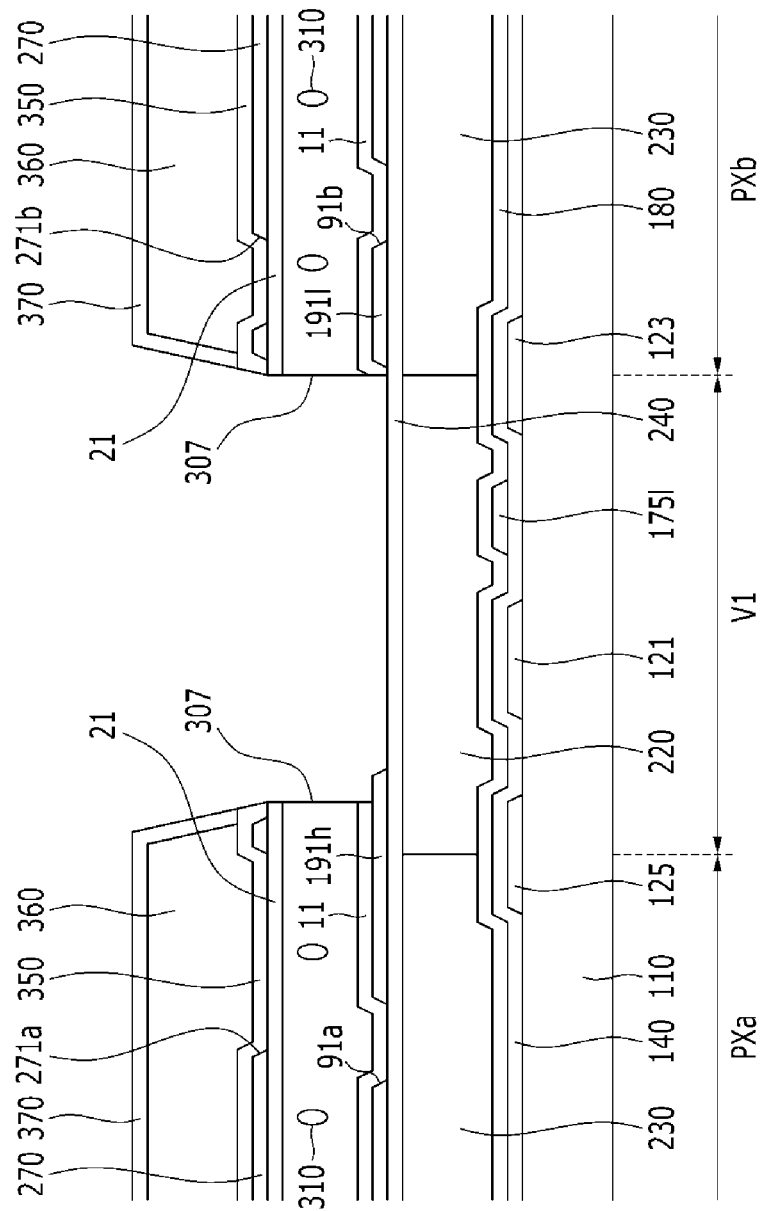
Figure 29:
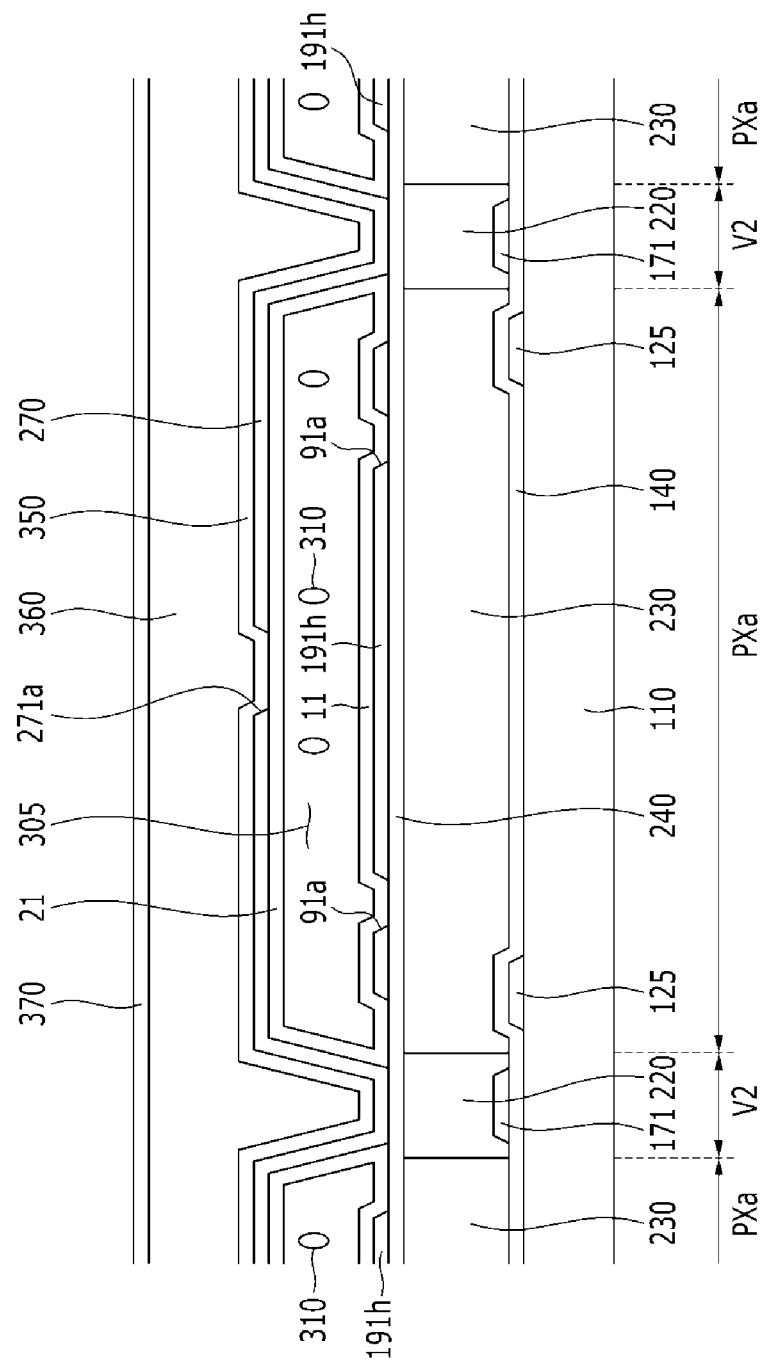

As illustrated in FIGS. 28 and 29, the third insulating layer 370 and the second insulating layer 350 positioned at the first valley V1 are removed by patterning the third insulating layer 370 and the second insulating layer 350 such that the sacrificial layer 300 positioned at the first valley V1 is exposed.

In an exemplary embodiment, the sacrificial layer 300 is substantially entirely removed by supplying a stripper solution on the substrate 110 where the sacrificial layer 300 is exposed. In an alternative exemplary embodiment, the sacrificial layer 300 may be substantially entirely removed by an ashing process. Since the thermal curing process is performed on the sacrificial layer 300, the sacrificial layer 300 is removed by the developer, but the sacrificial layer 300 may be easily removed by the stripper or ashing process.

When the sacrificial layer 300 is removed, a microcavity 305 is formed at a site where the sacrificial layer 300 is positioned.

The pixel electrode 191 and the common electrode 270 are spaced apart from each other with the microcavity 305 interposed therebetween, and the pixel electrode 191 and the roof layer 360 are spaced apart from each other with the microcavity 305 interposed therebetween. The common electrode 270 and the roof layer 360 are provided to cover the upper side and both sides of the microcavity 360.

In an exemplary embodiment, the microcavity 360 is exposed outside through a portion where the roof layer 360 and the common electrode 270 are removed, which is referred to as the liquid crystal injection hole 307. In an exemplary embodiment, The liquid crystal injection hole 307 is formed along the first valley V1. In an alternative exemplary embodiment, the liquid crystal injection hole 307 may be formed along the second valley V2.

Next, the roof layer 360 is cured by applying heat to the substrate 110 such that the shape of the microcavity 305 by the roof layer 360 is effectively maintained.

Next, when an aligning agent containing an alignment material is dropped on the substrate 110 by a spin coating method or an inkjet method, the aligning agent is injected into the microcavity 305 through the liquid crystal injection hole 307. When the aligning agent is injected into the microcavity 305 and then a curing process is performed, a solution component is evaporated and the alignment material remains on the inner wall of the microcavity 305.

Accordingly, the first alignment layer 11 may be provided on the pixel electrode 191, and the second alignment layer 21 may be provided below the common electrode 270. The first alignment layer 11 and the second alignment layer 21 face each other with the microcavity 305 therebetween and are connected to each other at the edge of the pixel area PX.

In an exemplary embodiment, the first and second alignment layers 11 and 21 may be aligned substantially in a vertical direction with respect to the substrate 110 except for the side of the microcavity 305. In an exemplary embodiment, a process of irradiating ultraviolet light to the first and second alignment layers 11 and 21 is performed such that the first and second alignment layers 11 and 21 may be aligned substantially in a horizontal direction with respect to the substrate 110.

Next, when the liquid crystal material including liquid crystal molecules 310 is dropped on the substrate 110 by an inkjet method or a dispensing method, the liquid crystal material is injected into the microcavity 305 through the liquid crystal injection hole 307. In an exemplary embodiment, the liquid crystal material may be dropped in the liquid crystal injection hole 307 formed along an odd-numbered first valley V1 but may not be dropped in the liquid crystal injection hole 307 formed along an even-numbered first valley V1. In an alternative exemplary embodiment, the liquid crystal material may be dropped in the liquid crystal injection hole 307 formed along the even-numbered first valley V1 but may not be dropped in the liquid crystal injection hole 307 formed along the odd-numbered first valley V1.

In an exemplary embodiment, where the liquid crystal material is dropped in the liquid crystal injection hole 307 formed along the odd-numbered first valley V1, the liquid crystal material passes through the liquid crystal injection hole 307 by capillary force to be injected into the microcavity 305. In such an embodiment, the liquid crystal material is effectively injected into the microcavity 305 by discharging air in the microcavity 305 through the liquid crystal injection hole 307 formed along the even-numbered first valley V1.

In an alternative exemplary embodiment, the liquid crystal material may be dropped in all the liquid crystal injection holes 307. In such an embodiment, the liquid crystal material may be dropped in the liquid crystal injection hole 307 formed along the odd-numbered first valley V1 and the liquid crystal injection hole 307 formed along the even-numbered first valley V1.

Figure 30:
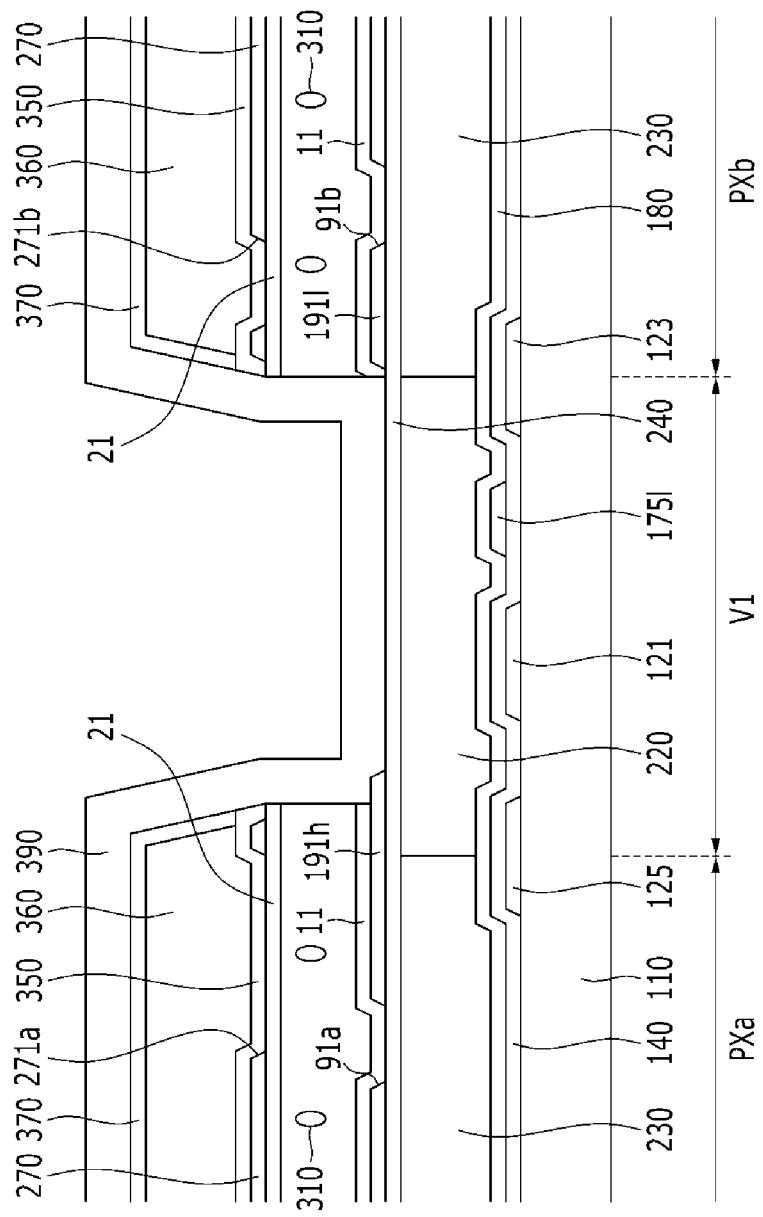
Figure 31:
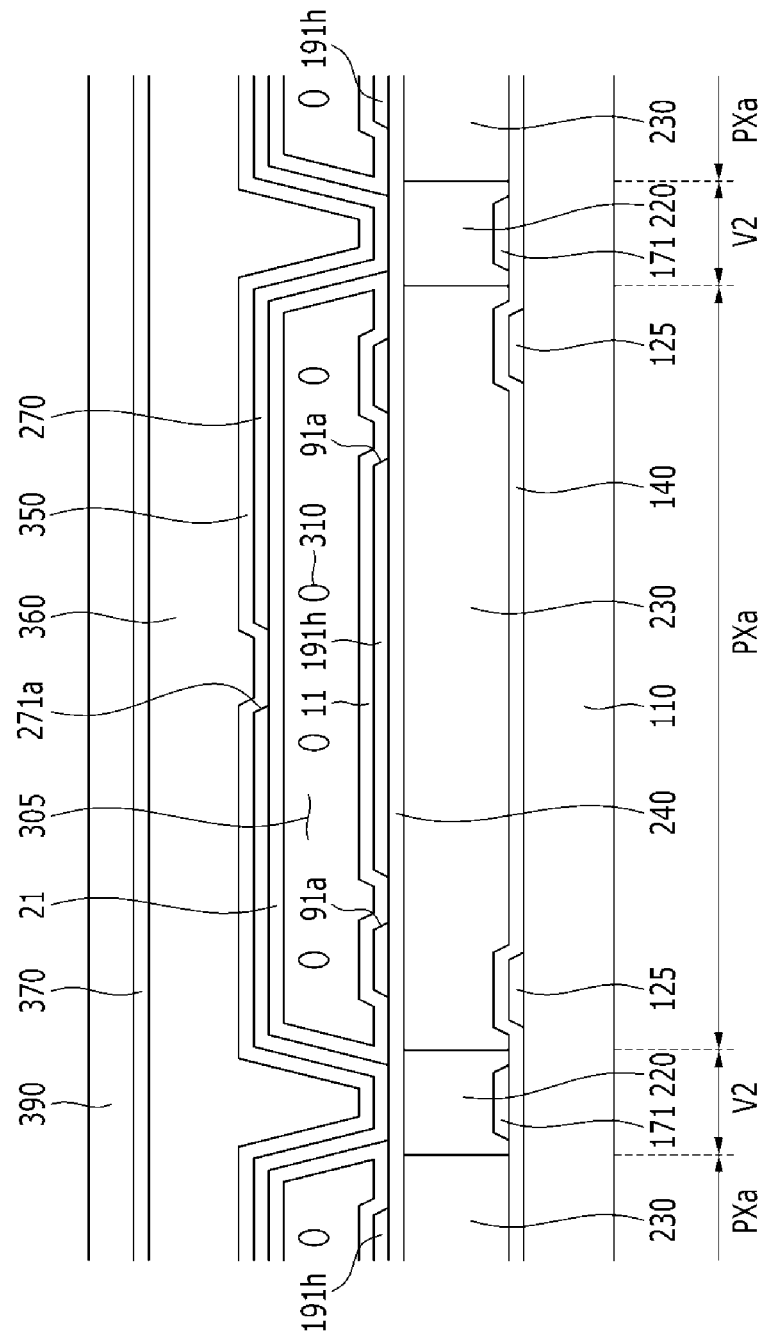

As illustrated in FIGS. 30 and 31, an encapsulation layer 390 is provided by depositing a material, which does not react with the liquid crystal molecule 310, on the third insulating layer 370. The encapsulation layer 390 is provided to cover the liquid crystal injection hole 307 where the microcavity 305 is exposed outside to seal the microcavity 305.

Next, polarizers (not shown) may be further attached onto the upper and lower sides of the display device. The polarizers may include a first polarizer and a second polarizer. The first polarizer may be attached onto the lower side of the substrate 110, and the second polarizer may be attached onto the encapsulation layer 390.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
   a substrate;
   a thin film transistor disposed on the substrate;
   a pixel electrode connected to the thin film transistor;
   a common electrode disposed on the pixel electrode and spaced apart from the pixel electrode, wherein a microcavity is defined between the pixel electrode and the common electrode, and a common electrode cutout is defined in the common electrode;
   a roof layer disposed on the common electrode;
   a liquid crystal injection hole formed through the common electrode and the roof layer, wherein the liquid crystal injection hole exposes a portion of the microcavity;
   a liquid crystal layer disposed in the microcavity; and
   an encapsulation layer disposed on the roof layer, wherein the encapsulation layer covers the liquid crystal injection hole and seals the microcavity,
   wherein a pixel electrode cutout is defined in the pixel electrode, and
   the pixel electrode cutout includes at least a continuous bar-shaped portion is adjacent to an edge of the pixel electrode and extending in a direction parallel to the edge of the pixel electrode.

2. The display device of claim 1, wherein
   the common electrode cutout has a cross shape.

3. The display device of claim 2, wherein
   an end of the common electrode cutout protrudes over the edge of the pixel electrode, when viewed from a top view.

4. The display device of claim 3, further comprising:
   a first alignment layer disposed on the pixel electrode; and
   a second alignment layer disposed below the common electrode,
   wherein at least one of the first alignment layer and the second alignment layer is a photo-aligned layer comprising a photopolymerizable material.

5. The display device of claim 4, wherein
   the liquid crystal layer comprises liquid crystal molecules, and
   the liquid crystal molecules are aligned substantially vertically with respect to a surface of the substrate when an electric field is not generated in the liquid crystal layer.

6. The display device of claim 5, wherein
   the liquid crystal molecules are aligned in a pretilt direction which is substantially parallel direction to a direction toward a central portion of the common electrode cutout of the common electrode from a point where edges of the pixel electrode meet.

7. The display device of claim 5, wherein
   the pixel electrode is divided into a plurality of subregions by edges of the pixel electrode and the common electrode cutout of the common electrode, and
   the liquid crystal molecules of the liquid crystal layer are aligned in different pretilt directions in each subregion.

8. The display device of claim 1, further comprising:
   a gate line disposed on the substrate; and
   a data line disposed on the substrate crossing the gate line,
   wherein a plurality of pixel areas is defined on the substrate,
   the pixel areas comprise a first subpixel area and a second subpixel area which are spaced apart from each other with the gate line therebetween,
   the pixel electrode comprises:
   a first subpixel electrode disposed in the first subpixel area; and
   a second subpixel electrode disposed in the second subpixel area, and
   the common electrode and the roof layer cover a side of the microcavity at an edge of each pixel area.

9. The display device of claim 8, wherein
   the side of the microcavity at the edge of each pixel area covered by the common electrode and the roof layer is substantially parallel to the data line, and
   the liquid crystal injection hole is defined between the first subpixel area and the second subpixel area.

10. A manufacturing method of a display device, comprising:
   providing a thin film transistor on a substrate;
   providing a pixel electrode connected to the thin film transistor on the substrate and providing a pixel electrode cutout including at least a continuous bar-shaped portion extending in a direction parallel to an edge of the pixel electrode;
   providing a sacrificial layer on the pixel electrode;
   thermal-curing the sacrificial layer;
   coating a photosensitive film on the common electrode;
   providing a photosensitive film pattern by exposing and developing the photosensitive film using a mask;
   providing a common electrode cutout by etching the common electrode using the photosensitive film pattern;
   removing the photosensitive film pattern by exposing and developing substantially an entire surface of the photosensitive film pattern;
   providing a common electrode cutout by patterning the common electrode;
   providing a roof layer on the common electrode;
   providing a liquid crystal injection hole which exposes a portion of the sacrificial layer by patterning the roof layer;

providing a microcavity between the pixel electrode and the common electrode by removing the sacrificial layer;

providing a liquid crystal layer by injecting a liquid crystal material into the microcavity through the liquid crystal injection hole; and providing an encapsulation layer on the roof layer to seal the microcavity.

11. The manufacturing method of a display device of claim 10, wherein the sacrificial layer and the photosensitive film comprise a positive photosensitive material.

12. The manufacturing method of a display device of claim 11, wherein the removing the photosensitive film pattern comprises developing the photosensitive film pattern using a developer.

13. The manufacturing method of a display device of claim 12, wherein the developer comprises tetramethyl ammonium hydroxide.

14. The manufacturing method of a display device of claim 10, wherein the removing the sacrificial layer comprises using a stripper or an ashing process.

15. The manufacturing method of a display device of claim 10, wherein the common electrode cutout has a cross shape, a pixel electrode cutout is defined on the pixel electrode, where the pixel electrode cutout is adjacent to an edge of the pixel electrode and extends along the edge of the pixel electrode, and an end of the common electrode cutout protrudes over the edge of the pixel electrode, when viewed from a top view.

16. The manufacturing method of a display device of claim 15, further comprising:

providing a first alignment layer on the pixel electrode and providing a second alignment layer below the common electrode by injecting a photopolymerizable material and an alignment material through the liquid crystal injection hole, after the providing the liquid crystal injection hole, and providing pretilt directions on the first alignment layer and the second alignment layer by generating an electric field in the liquid crystal layer and irradiating light, after the providing the liquid crystal layer.

17. The manufacturing method of a display device of claim 10, wherein a plurality of pixel areas are defined on the substrate, and the common electrode and the roof layer cover a side of the microcavity at an edge of each pixel area.

* * * * *